(12) United States Patent
Lewis et al.

(10) Patent No.: US 9,272,271 B2
(45) Date of Patent: Mar. 1, 2016

(54) MANUFACTURE OF CATALYST COMPOSITIONS AND SYSTEMS

(71) Applicant: General Electric Company, Schenectady, NY (US)

(72) Inventors: Larry Neil Lewis, Scotia, NY (US); Donald Wayne Whisenhunt, Jr., Niskayuna, NY (US); Dan Hancu, Clifton Park, NY (US); Ashish Balkrishna Mhadeshwar, Schenectady, NY (US); Benjamin Hale Winkler, Albany, NY (US); Daniel George Norton, Niskayuna, NY (US); Oltea Puica Siclovan, Rexford, NY (US); Ming Yin, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/311,219

(22) Filed: Jun. 20, 2014

(65) Prior Publication Data

US 2014/0378296 A1     Dec. 25, 2014

Related U.S. Application Data

(63) Continuation-in-part of application No. 12/789,592, filed on May 28, 2010, now Pat. No. 8,871,669, which (Continued)

(51) Int. Cl.
*B01J 29/00* (2006.01)
*B01J 29/04* (2006.01)
(Continued)

(52) U.S. Cl.
CPC ... *B01J 29/74* (2013.01); *B01J 21/04* (2013.01); *B01J 23/38* (2013.01); *B01J 23/40* (2013.01);
(Continued)

(58) Field of Classification Search
CPC ......... B01J 29/00; B01J 37/03; B01J 37/036; B01J 37/04; B01J 37/08; B01J 21/00; B01J 21/04; B01J 23/00; B01J 23/16; B01J 23/38; B01J 23/54; B01J 23/56; B01J 23/58; B01J 23/60; B01J 23/62; B01J 23/64; B01J 23/66; B01J 23/68; B01J 23/70; B01J 23/76; B01J 23/78; B01J 23/80; B01J 23/825; B01J 23/835; B01J 23/84; B01J 23/89
USPC ......... 502/60, 66, 73, 74, 104, 150, 240–262, 502/300–439
See application file for complete search history.

(56) References Cited

U.S. PATENT DOCUMENTS

| 4,480,050 A | 10/1984 | Brennan |
| 5,244,852 A | 9/1993 | Lachman |

(Continued)

FOREIGN PATENT DOCUMENTS

| DE | 4128629 | 8/1999 |
| EP | 0577438 | 5/1994 |

(Continued)

OTHER PUBLICATIONS

Raman, et al., Template-Based Approaches to the Preparation of Amorphous, Nanoporous Silicas, 1996, Chem. Mater., 8,1682-1701.

*Primary Examiner* — Cam N. Nguyen
(74) *Attorney, Agent, or Firm* — Joseph J. Christian

(57) ABSTRACT

A method of producing a catalyst composition is provided, the method comprising mixing (i) a first component comprising a zeolite, and (ii) a second component comprising a homogeneous solid mixture containing at least one catalytic metal and at least one metal inorganic support, wherein the first component and the second component form an intimate mixture, and wherein the homogeneous solid mixture is produced by mixing a reactive solution comprising a precursor of the metal inorganic support and a templating agent with a precursor of the catalyst metal, and calcining the mixture to form the homogeneous solid mixture. The templating agent affects one or more of pore size, pore distribution, pore spacing, or pore dispersity of the metal inorganic support. The pores of the solid mixture produced after calcination may have an average diameter in a range of about 1 nanometer to about 15 nanometers.

10 Claims, 8 Drawing Sheets

Related U.S. Application Data is a continuation-in-part of application No. 12/123,070, filed on May 19, 2008, now Pat. No. 8,530,369, application No. 14/311,219, which is a continuation-in-part of application No. 12/550,916, filed on Aug. 31, 2009, now abandoned.

(60) Provisional application No. 60/994,447, filed on Sep. 19, 2007.

(51) Int. Cl.

| | | |
|---|---|---|
| *B01J 29/06* | (2006.01) | |
| *B01J 21/00* | (2006.01) | |
| *B01J 23/00* | (2006.01) | |
| *B01J 31/00* | (2006.01) | |
| *B01J 37/00* | (2006.01) | |
| *C08F 4/02* | (2006.01) | |
| *C08F 4/60* | (2006.01) | |
| *B01J 29/74* | (2006.01) | |
| *B01J 37/02* | (2006.01) | |
| *B01J 37/03* | (2006.01) | |
| *B01J 21/04* | (2006.01) | |
| *B01J 23/38* | (2006.01) | |
| *B01J 23/40* | (2006.01) | |
| *B01J 23/48* | (2006.01) | |
| *B01J 23/50* | (2006.01) | |
| *B01J 23/74* | (2006.01) | |
| *B01J 35/10* | (2006.01) | |
| *C01B 21/04* | (2006.01) | |
| *B01D 53/94* | (2006.01) | |

(52) U.S. Cl.
CPC *B01J 23/48* (2013.01); *B01J 23/50* (2013.01); *B01J 23/74* (2013.01); *B01J 35/1061* (2013.01); *B01J 37/0201* (2013.01); *B01J 37/0203* (2013.01); *B01J 37/0242* (2013.01); *B01J 37/033* (2013.01); *B01J 37/036* (2013.01); *C01B 21/0466* (2013.01); *B01D 53/9418* (2013.01); *B01D 2255/104* (2013.01); *B01D 2255/106* (2013.01); *B01D 2255/1021* (2013.01); *B01D 2255/1023* (2013.01); *B01D 2255/1026* (2013.01); *B01D 2255/1028* (2013.01); *B01D 2255/2092* (2013.01); *B01D 2255/20723* (2013.01); *B01D 2255/20738* (2013.01); *B01D 2255/20746* (2013.01); *B01D 2255/20753* (2013.01); *B01D 2255/20769* (2013.01); *B01D 2255/20776* (2013.01); *B01D 2255/20792* (2013.01); *B01D 2255/502* (2013.01); *B01D 2255/504* (2013.01); *B01D 2255/9205* (2013.01); *B01D 2257/404* (2013.01); *B01D 2258/012* (2013.01)

(56) References Cited

U.S. PATENT DOCUMENTS

| | | | | |
|---|---|---|---|---|
| 5,510,306 | A | | 4/1996 | Murray |
| 5,609,839 | A | | 3/1997 | Itoh |
| 5,622,684 | A | * | 4/1997 | Pinnavaia et al. ............. 423/702 |
| 5,710,093 | A | * | 1/1998 | Rivas et al. .................... 502/439 |
| 5,750,459 | A | * | 5/1998 | Marella et al. ................ 502/304 |
| 5,770,778 | A | | 6/1998 | Naujokas |
| 5,772,972 | A | | 6/1998 | Hepburn |
| 5,785,946 | A | * | 7/1998 | Pinnavaia et al. ............. 423/701 |
| 5,795,559 | A | | 8/1998 | Pinnavaia |
| 5,800,799 | A | * | 9/1998 | Pinnavaia et al. ............. 423/702 |
| 5,800,800 | A | * | 9/1998 | Pinnavaia et al. ............. 423/702 |
| 5,802,845 | A | | 9/1998 | Abe |
| 5,840,264 | A | * | 11/1998 | Pinnavaia et al. ............. 423/277 |
| 5,855,864 | A | * | 1/1999 | Pinnavaia et al. ............. 423/708 |
| 5,879,645 | A | | 3/1999 | Park |
| 5,911,966 | A | * | 6/1999 | Muller et al. .................. 423/625 |
| 6,045,765 | A | * | 4/2000 | Nakatsuji et al. ........... 423/239.1 |
| 6,146,602 | A | * | 11/2000 | Narula et al. ................ 423/213.5 |
| 6,163,414 | A | * | 12/2000 | Kikuchi et al. ................ 359/776 |
| 6,284,211 | B1 | | 9/2001 | Miyadera |
| 6,410,473 | B1 | * | 6/2002 | Pinnavaia et al. ............... 502/74 |
| 6,413,902 | B1 | * | 7/2002 | Pinnavaia et al. ............. 502/167 |
| 6,465,387 | B1 | * | 10/2002 | Pinnavaia et al. ............. 502/158 |
| 6,576,568 | B2 | * | 6/2003 | Mandal et al. ................. 438/781 |
| 6,649,083 | B1 | * | 11/2003 | Pinnavaia et al. ............. 252/179 |
| 6,696,258 | B1 | * | 2/2004 | Wei et al. ....................... 435/7.2 |
| 6,703,343 | B2 | | 3/2004 | Park |
| 6,881,390 | B2 | | 4/2005 | Yaluris |
| 6,896,955 | B2 | * | 5/2005 | Mandal et al. .............. 428/312.6 |
| 6,936,232 | B2 | | 8/2005 | Gillespie |
| 6,946,109 | B2 | * | 9/2005 | Pinnavaia et al. ............. 423/335 |
| 6,962,193 | B2 | * | 11/2005 | Liu et al. ...................... 165/109.1 |
| 7,045,485 | B2 | | 5/2006 | Kelkar |
| 7,081,231 | B1 | | 7/2006 | Aardahl |
| 7,132,165 | B2 | | 11/2006 | Pinnavaia et al. |
| 7,166,545 | B2 | * | 1/2007 | Nishiyama et al. ............ 438/780 |
| 7,214,643 | B2 | * | 5/2007 | Yamamoto et al. ............ 502/300 |
| 7,220,684 | B2 | * | 5/2007 | Nishiyama et al. ............ 438/781 |
| 7,371,358 | B2 | | 5/2008 | Upchurch |
| 7,431,905 | B2 | | 10/2008 | Hancu |
| 7,485,271 | B2 | | 2/2009 | Golunski |
| 7,494,634 | B2 | | 2/2009 | Vitse |
| 7,612,011 | B2 | | 11/2009 | Vanderspurt et al. |
| 7,645,934 | B1 | * | 1/2010 | Fidanza et al. ................. 136/263 |
| 7,655,203 | B2 | | 2/2010 | Hancu |
| 7,709,414 | B2 | | 5/2010 | Fujdala |
| 7,803,338 | B2 | | 9/2010 | Socha |
| 7,867,598 | B2 | | 1/2011 | Miyairi |
| 8,034,311 | B2 | | 10/2011 | Ikeda |
| 8,037,674 | B2 | | 10/2011 | Kupe |
| 8,062,991 | B2 | | 11/2011 | Male et al. |
| 8,101,145 | B1 | | 1/2012 | Norton |
| 8,353,155 | B2 | | 1/2013 | Lewis et al. |
| 8,476,187 | B2 | | 7/2013 | Norton et al. |
| 8,505,285 | B2 | | 8/2013 | Winkler et al. |
| 8,530,369 | B2 | | 9/2013 | Lewis et al. |
| 8,586,501 | B2 | | 11/2013 | Lewis |
| 2003/0118960 | A1 | | 6/2003 | Balmer-Millar |
| 2003/0134745 | A1 | | 7/2003 | Park |
| 2003/0176280 | A1 | | 9/2003 | Caze |
| 2003/0232250 | A1 | * | 12/2003 | Nogami et al. ................. 429/313 |
| 2004/0087184 | A1 | * | 5/2004 | Mandal et al. ................. 438/781 |
| 2004/0229054 | A1 | * | 11/2004 | Ahluwalia et al. ............ 428/457 |
| 2004/0241067 | A1 | * | 12/2004 | Oki et al. .................... 423/213.2 |
| 2005/0014635 | A1 | * | 1/2005 | Zhou et al. ..................... 502/159 |
| 2005/0020442 | A1 | * | 1/2005 | Sermon et al. ................ 502/304 |
| 2005/0135980 | A1 | | 6/2005 | Park |
| 2005/0198092 | A1 | | 9/2005 | Shen |
| 2005/0215149 | A1 | * | 9/2005 | Ahluwalia ...................... 442/152 |
| 2005/0239643 | A1 | * | 10/2005 | Benderly et al. .............. 502/312 |
| 2006/0009349 | A1 | | 1/2006 | Fujimoto |
| 2006/0074218 | A1 | * | 4/2006 | Moon et al. .................... 528/297 |
| 2006/0075742 | A1 | | 4/2006 | Lee |
| 2006/0110308 | A1 | * | 5/2006 | Gupta et al. .................... 423/345 |
| 2006/0133976 | A1 | | 6/2006 | Male |
| 2006/0137817 | A1 | * | 6/2006 | Ma et al. ........................ 156/296 |
| 2006/0216227 | A1 | * | 9/2006 | Idem et al. ..................... 423/651 |
| 2006/0228283 | A1 | | 10/2006 | Malyala |
| 2007/0059223 | A1 | | 3/2007 | Golunski |
| 2007/0101704 | A1 | | 5/2007 | Goulette |
| 2007/0149385 | A1 | | 6/2007 | Liu |
| 2007/0160899 | A1 | * | 7/2007 | Atanassova et al. ............. 429/44 |
| 2008/0020925 | A1 | * | 1/2008 | Larcher et al. ................ 502/303 |
| 2008/0053073 | A1 | | 3/2008 | Kalyanaraman |
| 2008/0085231 | A1 | | 4/2008 | Vitse |
| 2008/0124264 | A1 | | 5/2008 | Ikeda |
| 2008/0124269 | A1 | | 5/2008 | Daudey |
| 2008/0131345 | A1 | | 6/2008 | Vitse |
| 2008/0141660 | A1 | | 6/2008 | Kim |
| 2009/0004079 | A1 | | 1/2009 | Hancu |
| 2009/0074641 | A1 | * | 3/2009 | Lewis et al. ................. 423/213.2 |
| 2009/0075813 | A1 | | 3/2009 | Whisenhunt |

(56) References Cited

U.S. PATENT DOCUMENTS

| | | |
|---|---|---|
| 2009/0093360 A1* | 4/2009 | Ma et al. .................... 502/182 |
| 2009/0263297 A1 | 10/2009 | Hancu |
| 2009/0318283 A1 | 12/2009 | Keshavan |
| 2010/0095591 A1 | 4/2010 | Hancu |
| 2010/0143227 A1 | 6/2010 | Keshavan et al. |
| 2010/0150801 A1 | 6/2010 | Keshavan et al. |
| 2010/0196236 A1* | 8/2010 | Lewis et al. ............... 423/239.1 |
| 2010/0196237 A1* | 8/2010 | Yin et al. ................... 423/239.1 |
| 2010/0233053 A1* | 9/2010 | Lewis et al. ............... 423/239.1 |
| 2011/0047988 A1 | 3/2011 | Lewis et al. |
| 2011/0047995 A1 | 3/2011 | Lewis |
| 2011/0120100 A1 | 5/2011 | Yin et al. |
| 2011/0152064 A1 | 6/2011 | Keshavan et al. |
| 2011/0152068 A1 | 6/2011 | Keshavan et al. |
| 2011/0166015 A1 | 7/2011 | Norton |
| 2011/0209466 A1 | 9/2011 | Yin et al. |
| 2012/0047877 A1 | 3/2012 | Winkler |
| 2012/0082606 A1 | 4/2012 | Lewis et al. |
| 2012/0093703 A1 | 4/2012 | Lewis et al. |
| 2012/0329644 A1 | 12/2012 | Siclovan et al. |
| 2013/0129575 A1 | 5/2013 | Lewis et al. |

FOREIGN PATENT DOCUMENTS

| | | |
|---|---|---|
| EP | 0207550 | 9/1995 |
| EP | 0714693 | 6/1996 |
| EP | 0787522 | 8/1997 |
| EP | 0947236 | 10/1999 |
| EP | 1029582 | 8/2000 |
| EP | 0895812 | 7/2003 |
| EP | 0914864 | 8/2007 |
| EP | 1832345 | 9/2007 |
| EP | 1944075 | 7/2008 |
| FR | 2842419 | 1/2004 |
| JP | 4354536 | 8/1992 |
| JP | 6126134 | 5/1994 |
| JP | 06343829 | 12/1994 |
| WO | 9929400 | 6/1999 |
| WO | 2005035108 | 4/2005 |
| WO | 2006027998 | 3/2006 |
| WO | 2006093802 | 9/2006 |
| WO | 2007049851 | 5/2007 |
| WO | 2009038855 | 3/2009 |
| WO | 2009038901 | 3/2009 |
| WO | 2011084484 | 7/2011 |

\* cited by examiner

MANUFACTURE OF CATALYST COMPOSITIONS AND SYSTEMS

TECHNICAL FIELD

The systems and techniques described include embodiments that relate to catalysts. They also include embodiments that relate to the making of catalysts and systems that may include catalysts.

DISCUSSION OF RELATED ART

Exhaust streams generated by the combustion of fossil fuels, such as in furnaces, ovens, and engines, contain various potentially undesirable combustion products including nitrogen oxides (NOx), unburned hydrocarbons (HC), and carbon monoxide (CO). NOx, though thermodynamically unstable, may not spontaneously decompose in the absence of a catalyst. Exhaust streams may employ exhaust treatment devices to remove NOx from the exhaust stream.

Examples of exhaust treatment devices include: catalytic converters (e.g., three-way catalyst, oxidation catalysts, selective catalytic reduction (SCR) catalysts, and the like), evaporative emissions devices, scrubbing devices (e.g., hydrocarbon (HC), sulfur, and the like), particulate filters/traps, adsorbers/absorbers, plasma reactors (e.g., non-thermal plasma reactors and thermal plasma reactors), and the like. A three-way catalyst (TWC catalyst) in a catalytic converter may reduce NO.sub.x by using CO and residual hydrocarbon. TWC catalysts may be effective over a specific operating range of both lean and rich fuel/air conditions and within a specific operating temperature range.

Particulate catalytic compositions in treatment of exhaust may enable optimization of the conversion of HC, CO, and NOx. The conversion rate may depend on several factors, including but not limited to the exhaust gas temperature. The catalytic converter may operate at an elevated catalyst temperature of about 300 degrees Celsius or higher. The time period between when the exhaust emissions begin (i.e., "cold start"), until the time when the substrate heats up to a light-off temperature, is the light-off time. Light-off temperature is the catalyst temperature at which fifty percent (50 percent) of the emissions from the engine convert as they pass through the catalyst. Alternative methods to heat the catalyst may be employed to bring catalyst temperature to the light off temperature.

The exhaust gases from the engine may heat the catalytic converter. This heating may help bring the catalyst to the light-off temperature. The exhaust gases pass through the catalytic converter relatively unchanged until the light-off temperature is reached. In addition, the composition of the engine exhaust gas changes as the engine temperature increases from a cold start temperature to an operating temperature, and the TWC catalyst may work with the exhaust gas composition that is present at normal elevated engine operating temperatures.

Selective Catalytic Reduction (SCR) may include a noble metal system, base metal system, or zeolite system. The noble metal catalyst may operate in a temperature range of from about 240 degrees Celsius to about 270 degrees Celsius, but may be inhibited by the presence of $SO_2$. The base metal catalysts may operate in a temperature range of from about 310 degrees Celsius to about 500 degrees Celsius, but may promote oxidation of $SO_2$ to $SO_3$. The zeolites can withstand temperatures up to 600 degrees Celsius and, when impregnated with a base metal may have a wide range of operating temperatures. Alternative methods to heat catalyst may be employed to bring catalyst temperature up to lightoff temperature.

SCR systems with ammonia as a reductant may yield $NO_x$ reduction efficiencies of more than 80 percent in large natural gas fired turbine engines, and in lean burn diesel engines. However, the presence of ammonia may be undesirable, and there may be some ammonia slip due to imperfect distribution of reacting gases as well as due to incomplete ammonia consumption. Further ammonia solutions require an extra storage tank and are subject to freezing at cold ambient temperatures.

SCR of $NO_x$ can also be accomplished with hydrocarbons. $NO_x$ can be selectively reduced by some organic compounds (e.g. alkanes, olefins, alcohols) over several catalysts under excess $O_2$ conditions. The injection of diesel or methanol has been explored in heavy-duty stationary diesel engines to supplement the HCs in the exhaust stream. However, the conversion efficiency may be reduced outside the temperature range of 300 degrees Celsius to 400 degrees Celsius. In addition, this technique may have HC-slip over the catalyst, transportation and on-site bulk storage of hydrocarbons, and possible atmospheric release of the HC. The partial oxidation of hydrocarbons may release CO, unburned HC, and particulates.

It may be desirable to have a catalyst that can effect emission reduction across a range of temperatures and operating conditions that differ from those currently available. It may also be desirable to have a catalyst that can effect $NO_x$ reduction using a reductant is different than the currently used reductants.

BRIEF DESCRIPTION

In one embodiment, a catalyst system is provided. The catalyst system comprises a first catalytic composition comprising, (i) a first component comprising a zeolite, and (ii) a second component comprising a homogeneous solid mixture containing at least one catalytic metal and at least one metal inorganic support; wherein the pores of the solid mixture have an average diameter in a range of about 1 nanometer to about 15 nanometers; wherein the first component and the second component form an intimate mixture.

In another embodiment, a catalyst system is provided. The catalyst system comprises a first catalytic composition comprising, (i) a first component comprising a zeolite, and (ii) a second component comprising a homogeneous solid mixture containing at least one catalytic metal and at least one metal inorganic support; wherein the pores of the solid mixture have an average diameter in a range of about 1 nanometer to about 15 nanometers; wherein the first component and the second component form an intimate mixture. The catalyst system further comprises a second catalytic composition disposed downstream from the first catalytic composition; the second catalytic composition comprising a first catalytic material disposed on a first substrate, wherein the first catalytic material is selected from the group consisting of platinum, palladium, ruthenium, rubidium, osmium, and iridium.

In yet another embodiment, an exhaust system is provided. The exhaust system comprises a fuel delivery system configured to deliver a fuel to an engine; an exhaust stream path configured to receive an exhaust stream from the engine, a reductant delivery system configured to deliver a reductant to the exhaust stream path; and a catalyst system disposed in the exhaust stream path. The catalyst system comprises: a first catalytic composition comprising, (i) a first component comprising a zeolite, and (ii) a second component comprising a homogeneous solid mixture containing at least one catalytic metal and at least one metal inorganic network; wherein the pores of the solid mixture have an average diameter in a range of about 1 nanometer to about 15 nanometers; wherein the first component and the second component form an intimate mixture.

In yet another embodiment, an exhaust system is provided. The exhaust system comprises a fuel delivery system configured to deliver a fuel to an engine; an exhaust stream path configured to receive an exhaust stream from the engine, a reductant delivery system configured to deliver a reductant to the exhaust stream path; and a catalyst system disposed in the exhaust stream path. The catalyst system comprises: a first catalytic composition comprising, (i) a first component comprising a zeolite, and (ii) a second component comprising a homogeneous solid mixture containing at least one catalytic metal and at least one metal inorganic network; wherein the pores of the solid mixture have an average diameter in a range of about 1 nanometer to about 15 nanometers; wherein the first component and the second component form an intimate mixture. The catalyst system further comprises a second catalytic composition disposed downstream from the first catalytic composition; the second catalytic composition comprising a first catalytic material disposed on a first substrate, wherein the first catalytic material is selected from the group consisting of platinum, palladium, ruthenium, rubidium, osmium, and iridium.

DETAILED DESCRIPTION

Figure 1:
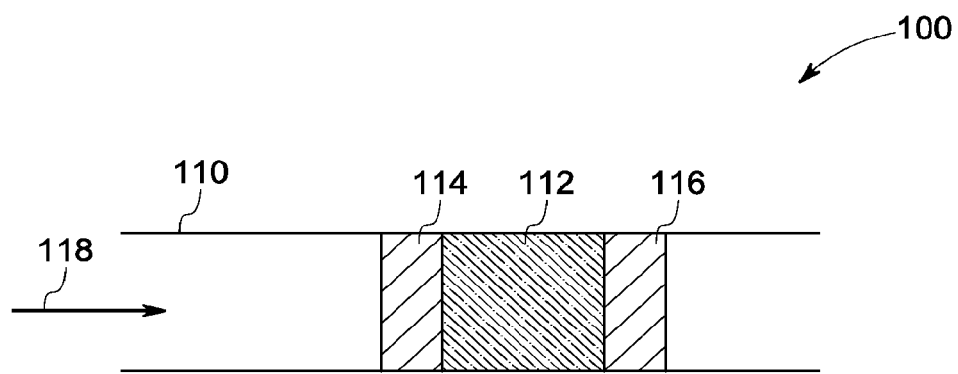
FIG. 1 is a schematic diagram depicting a catalyst system set-up in a furnace.

The systems and techniques described include embodiments that relate to catalysts and their use and manufacture. Other embodiments relate to articles that include catalysts and catalytic compositions that may chemically reduce $NO_x$ that is present in emissions generated during combustion, for example in furnaces, ovens, engines, and locomotives.

Embodiments of the invention described herein address the noted shortcomings of the state of the art. The catalyst system described herein fills the needs described above by employing a mixed bed catalyst system comprising at least a first catalytic composition comprising a first component comprising a zeolite, and a second component comprising a homogeneous solid mixture containing at least one catalytic metal and at least one metal inorganic support; wherein the pores of the solid mixture have an average diameter in a range of about 1 nanometer to about 15 nanometers; wherein the first component and the second component form an intimate mixture, to reduce the $NO_x$ in an exhaust gas. The second component produces nitrogen containing chemicals such as ammonia. The first component comprising the zeolite may use the ammonia or ammonia-like products generated by the second component as a $NO_x$ reductant to further reduce additional $NO_x$ in the exhaust gas. The catalyst system may further include a second catalytic composition used to oxidize any unwanted products of reaction or unused reactants or reductants. The catalyst system comprising the first component, second component, and optionally the second catalytic composition reduce $NO_x$ in the exhaust gas. In certain embodiments, the second catalytic composition is a diesel oxidation catalyst. The catalyst system may further comprise a third catalytic composition disposed between the first catalytic composition and the second catalytic composition. The third catalytic composition may comprise a zeolite or a second catalytic material disposed on a second substrate. The catalyst systems described herein further employs a hydrocarbon reductant, such as for example diesel. One advantage of using diesel as a reductant, is that it is readily available on board vehicles with diesel engines. In certain embodiments, a co-reductant may be used with hydrocarbon reductant to lower the light off temperature of the catalyst.

A catalyst is a substance that can cause a change in the rate of a chemical reaction without itself being consumed in the reaction. A slurry is a mixture of a liquid and finely divided particles. A sol is a colloidal solution. A powder is a substance including finely dispersed solid particles. A monolith may be a ceramic block having a number of channels, and may be made by extrusion of clay, binders and additives that are pushed through a dye to create a structure. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components unless otherwise stated. As used herein, the terms "disposed on" or "deposited over" or "disposed between" refers to both secured or disposed directly in contact with and indirectly by having intervening layers therebetween.

In one embodiment, a catalyst system is provided. The catalyst system comprises a first catalytic composition comprising, (i) a first component comprising a zeolite, and (ii) a second component comprising a homogeneous solid mixture containing at least one catalytic metal and at least one metal inorganic support; wherein the pores of the solid mixture have an average diameter in a range of about 1 nanometer to about 15 nanometers; and at least one promoting metal, wherein the first component and the second component form an intimate mixture.

In one embodiment, as stated above, the catalyst system may include a mixture of a first component and a second component. The first component and the second component may be intimately mixed together. The first catalytic composition formed by mixing the components may reduce the $NO_x$ present in emissions generated during combustion when in contact therewith. The mixed component catalytic composition may reduce a larger amount of $NO_x$ in an emission stream relative to a similar catalytic composition that is not intimately mixed together. The term "intimately" or "intimate" as it relates to the mixing of the first component and the second component is intended to mean that a portion of the respective compositions are in particulate form and the particulates are in physical contact with one another. The first component includes a zeolite while the second component includes a homogeneous solid mixture containing at least one catalytic metal and at least one metal inorganic support; wherein the pores of the solid mixture have an average diameter in a range of about 1 nanometer to about 15 nanometers; and at least one promoting metal.

In one embodiment, the first component may include a zeolite. In one embodiment, the zeolite is free of additional metals, i.e., the aluminum and silicon metal ions in the zeolite are not exchanged with any other metal ions, for example, iron or copper ions. The zeolites may be naturally occurring or synthetic. Examples of suitable zeolites are zeolite Y, zeolite beta, ferrierite, mordenite, ZSM-5, ZSM-12, ZSM-22, ZSM-23, ZSM-34, ZSM-35, ZSM-38, ZSM-48, ZSM-50, ZSM-57, zeolite A, zeolite X, or a combination comprising at least two of the foregoing zeolites. In one embodiment, the first component consists essentially of ferrierite. An exemplary zeolite is a ferrierite having a silicon to aluminum ratio of from about 10 to about 30. In another embodiment, the ferrierite has a silicon to aluminum ratio of from about 12 to about 25. In yet another embodiment, the ferrierite has a silicon to aluminum ratio of from about 15 to about 20. In one embodiment, the zeolite includes additional metals, i.e., the aluminum and silicon metal ions in the zeolite are exchanged with any other metal ions, for example, iron or copper ions. Examples of such ion exchanged zeolites include iron zeolite and copper zeolite.

Examples of commercially available zeolites that may be used as the first component are marketed under the following trademarks: CBV100, CBV300, CBV400, CBV500, CBV600, CBV712, CBV720, CBV760, CBV780, CBV901, CP814E, CP814C, CP811C-300, CP914, CP914C, CBV2314, CBV3024E, CBV5524G, CBV8014, CBV28014, CBV10A, CBV21A, CBV90A, or the like, or a combination including at least two of the foregoing commercially available zeolites.

The zeolite particles may be in the form of extrudates and generally have an average particle size of up to about 2 millimeters. In one embodiment, the zeolite particles have an average particle size of from about 0.001 millimeters to about 1.1 millimeters. In another embodiment, the zeolite particles have an average particle size of from about 0.1 millimeters to about 0.9 millimeters. In yet another embodiment, the zeolite particles have an average particle size of from about 0.2 millimeters to about 0.8 millimeters. In an exemplary embodiment, the zeolite particles have an average particle size of about 0.001 millimeter.

The zeolite particles may have a surface area of up to about 600 square meters per gram. In one embodiment, the zeolite particles may have a surface area in a range of from about 50 square meters per gram to about 600 square meters per gram. In another embodiment, the zeolite particles may have a surface area in a range of from about 80 square meters per gram to about 500 square meters per gram. In yet another embodiment, the zeolite particles may have a surface area in a range of from about 100 square meters per gram to about 400 square meters per gram. A high specific surface area typically results in more efficient conversion in addition to other factors including unit cell sizes, pore sizes, type of catalytic material, and exchanged metals.

As stated above, the second component comprises homogeneous solid mixture containing at least one catalytic metal and at least one metal inorganic support; wherein the pores of the solid mixture have an average diameter in a range of about 1 nanometer to about 15 nanometers; and at least one promoting metal. In one embodiment, the catalytic metal may include one or more of alkali metals, alkaline earth metals, and transition metals. Suitable metals that may be used as the catalytic metal may include silver, platinum, gold, palladium, iron, nickel, cobalt, gallium, indium, ruthenium, rhodium, osmium, iridium, or combinations of at least two of the foregoing metals. In one embodiment, the catalytic metal is selected from one or more of gallium, indium, and silver. In one embodiment, the catalytic metal is silver.

In one embodiment, the metal inorganic support has pores. The porous metal inorganic support is a reaction product of a reactive solution, a solvent, a modifier and a templating agent. A method includes mixing a reactive solution and a templating agent to form a gel; and calcining the gel to form a porous metal inorganic support that is capable of supporting a catalyst composition. The metal inorganic support may be manufactured via a process, as described in co-pending U.S. patent application Ser. No. 12/123,070 now U.S. Pat. No. 8,530,369 which is incorporated herein in its entirety. As used herein, without further qualifiers, porous refers to a material containing pores with diameters in a range of from about 1 nanometer to about 15 nanometers.

In one embodiment, the average pore size of the metal inorganic support is controlled and selected to reduce or eliminate poisoning. Poisoning may affect catalytic ability, and may be by aromatic species present in the reductant or in the exhaust gas stream. The porous material described herein is more resistant to poisoning from an aromatic containing reductant than a baseline typical gamma phase alumina impregnated with silver.

In various embodiments, the catalytic metal may be present in the second component in an amount greater than about 0.25 mole percent. One skilled in the art will appreciate that the amount selection may be based on end use parameters, economic considerations, desired efficacy, and the like. In one embodiment, the amount of the catalytic metal present in the second component is in a range of from about 0.25 mole percent to about 10 mole percent. In another embodiment, the amount of the catalytic metal present in the second component is in a range of from about 0.5 mole percent to about 9 mole percent. In yet another embodiment, the amount of the catalytic metal present in the second component is in a range of from about 1 mole percent to about 8 mole percent. In one embodiment, the amount of catalytic metal in the first second component is about 1.5 mole percent to about 6 mole percent.

In one embodiment, the metal inorganic support may include an inorganic material. As used herein, the phrase "metal inorganic support" means a support that comprises an inorganic material, which material in part contains atoms or cations of one or more of the metal elements. Suitable inorganic materials may include, for example, oxides, carbides, nitrides, hydroxides, oxides, carbonitrides, oxynitrides, borides, or borocarbides. In one embodiment, the inorganic oxide may have hydroxide coatings. In one embodiment, the inorganic oxide may be a metal oxide. The metal oxide may have a hydroxide coating. Other suitable metal inorganics may include one or more metal carbides, metal nitrides, metal hydroxides, metal carbonitrides, metal oxynitrides, metal borides, or metal borocarbides. Metallic cations used in the foregoing inorganic materials can be transition metals, alkali metals, alkaline earth metals, rare earth metals, or the like.

Examples of suitable inorganic oxides include silica ($SiO_2$), alumina ($Al_2O_3$), titania ($TiO_2$), zirconia ($ZrO_2$), ceria ($CeO_2$), manganese oxide ($MnO_2$), zinc oxide (ZnO), iron oxides (for example, FeO, beta-$Fe_2O_3$, gamma-$Fe_2O_3$, beta-$Fe_2O_3$, $Fe_3O_4$, or the like), calcium oxide (CaO), and manganese dioxide (MnO2 and $Mn_3O_4$). Examples of suitable inorganic carbides include silicon carbide (SiC), titanium carbide (TiC), tantalum carbide (TaC), tungsten carbide (WC), hafnium carbide (HfC), or the like. Examples of suitable nitrides include silicon nitrides ($Si_3N_4$), titanium nitride (TiN), or the like. Examples of suitable borides include lanthanum boride ($LaB_6$), chromium borides (CrB and $CrB_2$), molybdenum borides ($MoB_2$, $Mo_2B_5$ and MoB), tungsten boride ($W_2B_5$), or the like. In one embodiment, the inorganic substrate is alumina. The alumina employed may be crystalline or amorphous. In one embodiment, the porous metal inorganic support comprises porous alumina and the catalytic metal comprises silver.

In one embodiment, the metal inorganic support has a mean pore size greater than about 0.5 nanometers. In one embodiment, the metal inorganic support may have average diameter of pores in a range of from about 1 nanometer to about 15 nanometers. In another embodiment, the metal inorganic support may have average diameter of pores in a range of from about 2 nanometers to about 12 nanometers. In yet another embodiment, the metal inorganic support may have average diameter of pores in a range of from about 3 nanometers to about 15 nanometers. In one embodiment, the metal inorganic support may have average diameter of pores in a range of from about 1 nanometer to about 5 nanometers. The average diameter of pores may be measured using nitrogen adsorption measurements with BET method. BET theory is a rule for the physical adsorption of gas molecules on a solid surface and serves as the basis for an important analysis technique for the measurement of the specific surface area of a material. BET is short hand for the inventors' names: Stephen Brunauer, Paul Hugh Emmett, and Edward Teller who developed the theory.

In certain embodiments, the pore size has a narrow monomodal distribution. In one embodiment, the pores have a pore size distribution polydispersity index that is less than about 1.5, less than about 1.3, or less than about 1.1. In one embodiment, the distribution of diameter sizes may be bimodal, or multimodal.

In another embodiment, the porous metal inorganic support includes one or more stabilizers, which may be added to the metal inorganic support. For example, in various embodiments, the metal inorganic support comprising predominantly alumina has smaller amounts of yttria, zirconia, or ceria added to it. In one embodiment, the amount of yttria, zirconia, or ceria is in a range of about 0.1 percent to about 10 percent based on the weight of the alumina. In another embodiment, the amount of yttria, zirconia, or ceria is in a range of about 1 percent to about 9 percent based on the weight of the alumina. In yet another embodiment, the amount of yttria, zirconia, or ceria is in a range of about 2 percent to about 6 percent based on the weight of the alumina.

In one embodiment, the pores may be distributed in a controlled and repeating fashion to form a pattern. In another embodiment, the pore arrangement is regular and not random. As defined herein, the phrase "pore arrangement is regular" means that the pores may be ordered and may have an average periodicity. The average pore spacing may be controlled and selected based on the surfactant selection that is used during the gelation. In one embodiment, the pores are unidirectional, are periodically spaced, and have an average periodicity. In one embodiment, the porous metal inorganic support has pores that have a spacing of greater than about 20 Angstroms. In one embodiment, the spacing is in a range of from about 30 Angstroms to about 300 Angstroms. In another embodiment, the spacing is in a range of from about 50 Angstroms to about 200 Angstroms. In yet another embodiment, the spacing is in a range of from about 60 Angstroms to about 150 Angstroms. The average pore spacing (periodicity) may be measured using small angle X-ray scattering. In yet another embodiment, the pore spacing is random.

The porous metal inorganic support may have a surface area greater than about 50 square meters per gram. In one embodiment, the porous metal inorganic support has a surface area that is in a range of from about 50 square meters per gram to about 2000 square meters per gram. In another embodiment, the porous metal inorganic support has a surface area that is in a range of from about 100 square meters per gram to about 1000 square meters per gram. In one embodiment, the porous metal inorganic support has a surface area that is in a range of from about 300 square meters per gram to about 600 square meters per gram.

The porous metal inorganic support may be present in the second component in an amount that is greater than about 50 mole percent based on the first catalytic composition. In one embodiment, the amount present is in a range of from about 50 mole percent to about 99 mole percent of the second component based on the first catalytic composition. In another embodiment, the amount present is in a range of from about 55 mole percent to about 89 mole percent of the second component based on the first catalytic composition. In yet another embodiment, the amount present is in a range of from about 60 mole percent to about 79 mole percent of the second component based on the first catalytic composition. In one embodiment, the amount present is in a range of from about 94 mole percent to about 99 mole percent of the second component based on the first catalytic composition.

The porous metal inorganic support may be made up of particles. The particles may be agglomerates, a sintered mass, a surface coating on a support, or the like. The porous metal inorganic support may have an average particle size of up to about 4 millimeters. In one embodiment, the porous inorganic materials may have an average particle size in a range of from about 5 micrometers to about 3 millimeters. In another embodiment, the porous inorganic materials may have an average particle size in a range of from about 500 micrometers to about 2.5 millimeters. In yet another embodiment, the porous inorganic materials may have an average particle size in a range of from about 1 millimeter to about 2 millimeters. In an exemplary embodiment, the porous substrate has an average particle size of about 40 micrometers.

The second component may be present in an amount of up to about 90 weight percent, based upon the total weight of the first catalytic composition. In one embodiment, the second component in the form of a bed may be present in an amount in a range of from about 1 weight percent to about 90 weight percent, based upon the total weight of the first catalytic composition. In another embodiment, the second component may be present in an amount in a range of from about 20 weight percent to about 80 weight percent, based upon the total weight of the first catalytic composition. In yet another embodiment the second component may be present in an amount in a range of from about 50 weight percent to about 70 weight percent, based upon the total weight of the first catalytic composition. In various embodiments, the ratio is determined by the quantity of species generated on the first bed that are utilized on the second bed. This will depend on several variables specific to the particular exhaust application where the catalyst system may be employed. The type of engine or turbine, the exhaust temperature, the flow rate, concentration of $NO_x$, etc. all factor into determining the ratio of the first catalytic composition to the second catalytic composition. The ratio can be optimized for a particular application in a way such as to achieve the highest $NO_x$ conversion in a given system.

In one embodiment, the second component further comprises at least one promoting metal. A promoting metal is a metal that enhances the action of a catalyst. In one embodiment, the promoting metal may be selected from the group consisting gallium, indium, gold, vanadium, zinc, tin, bismuth, cobalt, molybdenum, and tungsten. In one embodiment, the promoting metal may be present in an amount in a range of from about 0.1 weight percent to about 20 weight percent, based upon the total weight of the second component. In another embodiment, the first catalytic composition may be present in an amount in a range of from about 0.5 weight percent to about 15 weight percent, based upon the total weight of the second component. In yet another embodiment, the first catalytic composition may be present in an amount in a range of from about 1 weight percent to about 12 weight percent, based upon the total weight of the second component.

The first component and the second component may intimately mix to form the first catalytic composition. A synergy may exist between the first component and the second component, which may affect the reduction reaction of $NO_x$ to nitrogen when compared with other comparative catalyst. The first catalytic composition may facilitate the conversion of long chain hydrocarbons ($C_5$ to $C_{24}$) into short chain hydrocarbons ($C_1$ to $C_4$). The short chain hydrocarbons may affect reduction efficiency.

In one embodiment, the catalyst system further comprises a second catalytic composition disposed downstream from the first catalytic composition. The second catalytic composition comprises a first catalytic material disposed on a first substrate. The first catalytic material may be selected from the group consisting of one or more of platinum, palladium, ruthenium, rhodium, osmium, and iridium. Suitable materials that may be employed as the first substrate include the inorganic materials described above for the metal inorganic support. The first catalytic material is typically used to oxidize any unwanted products of reaction or unused reactants or reductants In one embodiment, the second catalytic composition is a diesel oxidation catalyst (DOC). A DOC is a flow through device that consists of a canister containing a honeycomb-like structure or substrate. The first substrate has a large surface area that is coated with an active catalyst layer. This layer contains a small, well dispersed amount of precious metals such as platinum or palladium. As the exhaust gases traverse the DOC, carbon monoxide, gaseous hydrocarbons and liquid hydrocarbon particles (unburned fuel and oil) are oxidized, thereby reducing harmful emissions.

The first catalytic material may be present in the second catalytic composition in an amount up to about 50 mole percent based on the amount of the catalyst system. In one embodiment, the first catalytic material is present in the second catalytic composition in an amount in a range of from about 0.025 mole percent to about 50 mole percent based on the amount of the catalyst system. In another embodiment, the first catalytic material is present in the second catalytic composition in an amount in a range of from about 0.5 mole percent to about 40 mole percent based on the amount of the catalyst system. In yet another embodiment, the first catalytic material is present in the second catalytic composition in an amount in a range of from about 1.0 mole percent to about 30 mole percent based on the amount of the catalyst system. In one embodiment, the amount of first catalytic material in the second catalytic composition is about 1.5 mole percent based on the amount of the catalyst system. In another embodiment, the amount of first catalytic material in the second catalytic composition is about 5 mole percent based on the amount of the catalyst system.

The second catalytic composition may be used in an amount of up to about 90 weight percent, based upon the total weight of the catalyst system. In one embodiment, the second catalytic composition may be used in an amount in a range of from about 10 weight percent to about 80 weight percent based upon the total weight of the catalyst system. In another embodiment, the second catalytic composition may be used in an amount in a range of from about 20 weight percent to about 70 weight percent based upon the total weight of the catalyst system. In yet another embodiment, the second catalytic composition may be used in an amount in a range of from about 30 weight percent to about 60 weight percent based upon the total weight of the catalyst system.

In one embodiment, the first substrate may include an inorganic material. In one embodiment, the inorganic materials may include the materials listed above for the metal inorganic support. Suitable materials that may be employed as the first substrate include at least one member selected from the group consisting of alumina, titania, zirconia, ceria, silicon carbide and mixtures thereof.

In one embodiment, the catalyst system further comprises a delivery system configured to deliver a reductant. When the catalytic composition is employed to reduce $NO_x$ generated in emissions from furnaces, ovens, locomotives and engines, a variety of hydrocarbons may be effectively used as a reductant. In one embodiment, the reductant is a hydrocarbon. In one embodiment, the hydrocarbon has an average carbon chain length in the range of about 2 carbon atoms to about 24 carbon atoms. In one embodiment, the reductant is one or more of diesel, ultra-low sulfur diesel, ethanol, gasoline, and octane. In one embodiment, the reductant is an oxygenated hydrocarbon. In one embodiment, the oxygenated hydrocarbon is ethanol.

In an exemplary embodiment, diesel can be used as a reductant. The catalytic composition can reduce $NO_x$ while using higher hydrocarbons having from about 5 to about 9 carbon atoms per molecule as a reductant. The catalyst system advantageously functions across a variety of temperature ranges. Suitable temperature ranges may include temperatures of greater than about 325 degrees Celsius. Other temperatures ranges may include those up to about 400 degrees Celsius.

In certain embodiments, a co-reductant may be used with hydrocarbon reductant to lower the light off temperature of the catalyst. In one embodiment, the co-reductant is hydrogen. In one embodiment, the amount of co-reductant employed may be in a range of from about 0 parts per million to about 4000 parts per million based on the total volumetric flow rate of the exhaust. In another embodiment, the amount of co-reductant employed may be in a range of from about 10 parts per million to about 3000 parts per million based on the total volumetic flow rate of the exhaust. In yet another embodiment, the amount of co-reductant employed may be in a range of from about 20 parts per million to about 2000 parts per million based on the total volumetic flow rate of the exhaust. In one embodiment, the amount of co-reductant employed may be in a range of from about 0 parts per million to about 1000 parts per million based on the total volumetic flow rate of the exhaust.

In another embodiment, a catalyst system is provided. The catalyst system comprises a first catalytic composition comprising, (i) a first component comprising a zeolite, and (ii) a second component comprising a homogeneous solid mixture containing at least one catalytic metal and at least one metal inorganic support; wherein the pores of the solid mixture have an average diameter in a range of about 1 nanometer to about 15 nanometers; and at least one promoting metal. The catalyst system further comprises a second catalytic composition disposed downstream from the first catalytic composition; the second catalytic composition comprising a first catalytic material disposed on a first substrate, wherein the first catalytic material is selected from the group consisting of platinum, palladium, ruthenium, rubidium, osmium, and iridium.

In one embodiment, a third catalytic composition is disposed between the first catalytic composition and the second catalytic composition. In one embodiment, the third catalytic composition comprises a zeolite. In another embodiment, the third catalytic composition comprises a second catalytic material disposed on a second substrate, wherein the second catalytic material selected from the group consisting of one or more of tungsten, titanium, and vanadium.

In one embodiment, the zeolite may include the zeolites listed above for the first catalytic composition. In one embodiment, the second substrate comprises an inorganic material. In one embodiment, the inorganic materials forming the second substrate may include the materials listed above for the metal inorganic support. Suitable materials that may be employed as the second substrate include at least one member selected from the group consisting of alumina, titania, zirconia, ceria, silicon carbide and mixtures thereof.

In a method of using the catalyst system, the catalyst system is disposed in the exhaust stream of an internal combustion engine. The internal combustion engine may be part of a variety of mobile or fixed assets, for example, an automobile, locomotive, or power generator. Because different engines have different combustion characteristics, the exhaust stream components differ from one system to another. Such differences may include variations in $NO_x$ levels, presence of sulfur, and the presence or quantity of other species of reaction product. Changes in the operating parameters of the engine may also alter the exhaust flow characteristics. Examples of differing operating parameters may include temperature and flow rate. The catalyst may be used to reduce $NO_x$ to nitrogen and oxygen at a desirable rate and at a desirable temperature appropriate for the given system and operating parameters. The catalyst system may be disposed in the exhaust gas path in any of a variety of ways, for example, either in powdered form, in the form of an extruded monolith, or as a washcoated substrate. Various techniques for creating such powder beds, extrudates, or coated substrates are know in the art, and may be applied as appropriate for the desired composition and catalyst form. Further in various embodiments, each of the catalytic compostions could be supported separately or on the same support. They could even overlap or be partially mixed.

During operation, the catalyst system can convert the $NO_x$ present in an exhaust stream by about 90 weight percent. In one embodiment, the catalyst system can convert the $NO_x$ present in an exhaust stream in an amount in a range of from about 10 weight percent to about 90 weight percent based on the weight of the exhaust stream. In another embodiment, the catalyst system can convert the $NO_x$ present in an exhaust stream in an amount in a range of from about 20 weight percent to about 80 weight percent based on the weight of the exhaust stream. In yet another embodiment, the catalyst system can convert the $NO_x$ present in an exhaust stream in an amount in a range of from about 30 weight percent to about 70 weight percent based on the weight of the exhaust stream.

The following examples illustrate methods and embodiments in accordance with exemplary embodiments, and as such should not be construed as imposing limitations upon the claims. All components are commercially available from common chemical suppliers. The component and the source are listed in Table 1 given below.

TABLE 1

| Component | Source |
|---|---|
| Ethylacetoacetate | Aldrich |
| Triton X114 | Aldrich |
| Aluminum sec-butoxide | Gelest |
| Silver nitrate | GFS chemicals Inc. |
| 2-propanol | EM Scientific |
| Fe-Zeolite and Cu-Zeolite | Umicore |

Example 1

Preparation of Porous Alumina with Silver

A 100 gallon reactor equipped with a stirrer was charged with: isopropyl alcohol (72 kilograms), ethylacetoacetate (936 grams), triton X114 (3.12 kilograms) and Aluminum (sec-butoxide)$_3$ (18 kilograms). The resultant mixture was stirred for about 30 minutes, at a temperature of about 28 degrees Celsius to form a first solution. In another separate flask, silver nitrate (290.4 grams) was dissolved in water (2.64 liters) and then isopropyl alcohol (22 kilograms) was added to form a second solution. The second solution was added to the first solution at an addition rate of about 180 milliliters per minute. An increase in temperature to about 35 degrees Celsius was noted after the addition. The resultant solution was stirred at 28 degrees Celsius for another 2.5 hours. The solution was then heated to reflux. The solution was stirred (stirring rate of 120 revolutions per minute) and maintained at reflux for a period of about 36 hours.

The resultant solution was spray dried at a temperature of about 100 degrees Celsius to remove the solvents to provide a powder with a yield of over 80 percent, and having an average particle size diameter of less than about 10 microns. The spray dried powder was then further processed in two steps, (i) pyrolysis and (ii) calcination. The two step process was performed to remove the organic components Triton X114, ethyl acetoacetate, and isopropyl alcohol, without exposing the powder to the temperature rise equivalent to combustion of the organic components.

For step (i) pyrolysis, the powder was loaded in multiple batches, into two quartz boats, in a 6 inch quartz tube, in a 5 feet long tube furnace. Each boat held approximately 1 kilogram of spray dried powder. 20 standard cubic feet per hour of nitrogen ($N_2$) was fed to the tube. The furnace was then heated following the heating profile: heated to 100 degrees Celsius at a rate of 5 degrees Celsius per minute, maintained for 3 hours, heated to 550 degrees Celsius at 2 degrees Celsius per minute, maintained for 6 hours, and then the furnace was cooled to 28 degrees Celsius at the natural cooling rate of the furnace using convection cooling. The heating resulted in either the evaporation of the organics, or their decomposition into lighter components or carbonaceous material. During the pyrolysis process, the powder lost about 50-55 percent of its mass and roughly 50 percent of its volume. This process was repeated in several batches to pyrolyze all of the spray dried pyrolyzed powder.

The (i) pyrolysis step was followed by a (ii) calcination step in order to remove any residual carbonaceous material and fully oxidize any remaining hydroxyls. The pyrolyzed powder was loaded into multiple alumina boats that were stacked in a muffle furnace in air (CM Furnace having a capacity around 216 cubic inches). The furnace was heated to 600 degrees Celsius at a rate of 1 degree Celsius per minute, and maintained at this temperature for about 3 hours, followed by cooling the furnace to 28 degrees Celsius at the natural cooling rate of the furnace using convection cooling. During the calcination process, the powder lost approximately about 10 percent of its mass based on the pyrolyzed powder, resulting in an approximate 60 percent mass loss based on the original spray dried powder. This process was repeated in several batches to calcine the spray dried pyrolyzed powder. The resultant powder had a surface area of about 336 square meters per gram, a pore diameter of about 39.6 Angstroms and a pore volume of about 0.42 cubic centimeter per gram.

Example 2

Preparation of Monolith Coated with Porous Alumina with Silver

A slurry was prepared in isopropyl alcohol using the porous alumina with silver prepared in Example 1. The slurry comprised 25 weight percent porous alumina with silver in isopropyl alcohol. The resultant slurry was mixed in a Planetary Centrifugal Mixer (Thinky, capacity 310 cubic centimeters) for about 30 seconds and then ultrasonically milled for about 5 minutes. The slurry turned chocolate milk brown. The slurry was wash coated onto a cordierite monolith having a dimension of 6.23 milliliters bulk volume by dipcoating. The coated cordierite monolith was then calcined at 550 degrees Celsius for about 4 hours to obtain a white colored catalyst comprising silver and alumina washcoated on the cordierite monolith. Weight of porous alumina with silver was 0.81 grams on cordierite monolith initially weighing 3.18 grams.

Example 3

Preparation of H-Ferrierite 100 grams of Ferrierite zeolite $NH_4$—$CP_{914}C$ obtained from Zeolyst International (Valley Forge, Pa.) was calcined in a quartz tube furnace in order to convert the ferrierite to its H form. The powder was calcined using a dry feed at 6 standard cubic feet per hour in a 3 inch internal diameter, 4 feet long quartz furnace. The ferrierite powder material was soaked in nitrogen and the resultant mixture was heated at 5 degrees Celsius per minute to a temperature of 110 degrees Celsius, and the mixture was maintained at 110 degrees Celsius for 1 hour. The resultant material was then heated to 550 degrees Celsius at a rate of 2 degrees Celsius per minute and maintained at 550 degrees Celsius for 1 hour in nitrogen atmosphere. The gas was switched from nitrogen to air and the resultant material was maintained for additional 4 hours under an atmosphere of air. The resultant powder was cooled at a rate of 5 degrees Celsius per minute to about 28 degrees Celsius under an atmosphere of air to provide H-Ferrierite.

Example 4

Preparation of Monolith Coated with a Mixture of Porous Alumina with Silver (as Prepared in Example 1) and H-Ferrierite (as Prepared in Example 2)

A slurry of porous alumina prepared in Example 1 and H-Ferrierite prepared in Example 3 was prepared with a total solids loading of 25 weight percent in isopropyl alcohol to obtain porous alumina:H-ferrierite in a ratio of from about 16:1 by weight in isopropyl alcohol. The resultant slurry was mixed in a Planetary Centrifugal Mixer (Thinky, capacity 310 cubic centimeters) for about 30 seconds. The slurry was white in color. The slurry was wash coated onto a cordierite monolith having a dimension of 6.23 milliliters bulk volume, by dip coating. The coated cordierite monolith was then calcined at 550 degrees Celsius for about 4 hours to obtain a white colored catalyst comprising porous alumina with silver and H-ferrierite wash coated on cordierite monolith. Weight of porous alumina with silver and H-ferrierite was 1.42 grams on cordierite monolith initially weighing 3.08 grams.

Assembling the Catalyst Systems in Different Configurations.

Base configuration for comparative study: Referring to FIG. 1, a catalyst system 100 for determining the $NO_x$ reducing capabilities of a catalytic composition prepared in Example 2 112 is provided. The catalytic composition 112, was placed in a quartz tube 110 having an outer diameter of one inch. The catalytic composition prepared in Example 2 112 was placed inside the quartz tube between two plugs of quartz wool 114 and 116. The bulk volume of the catalytic composition i.e., the monolith 112 prepared in Example 2 was 6.23 milliliters. The weight of the coating of porous alumina with silver (prepared in Example 1) was 0.81 grams. The total weight of the monolith and porous alumina with silver was 3.99 grams. Each plug of quartz wool spanned a length of about 0.5 inch long along the length of the quartz tube 110 and weighed about 0.5 grams. The quartz tube 110 is then placed in a furnace (not shown in figure). This catalyst system has been used in comparative examples CE-1 to CE-8 to show the $NO_x$ reduction properties of the catalyst system.

Figure 2:
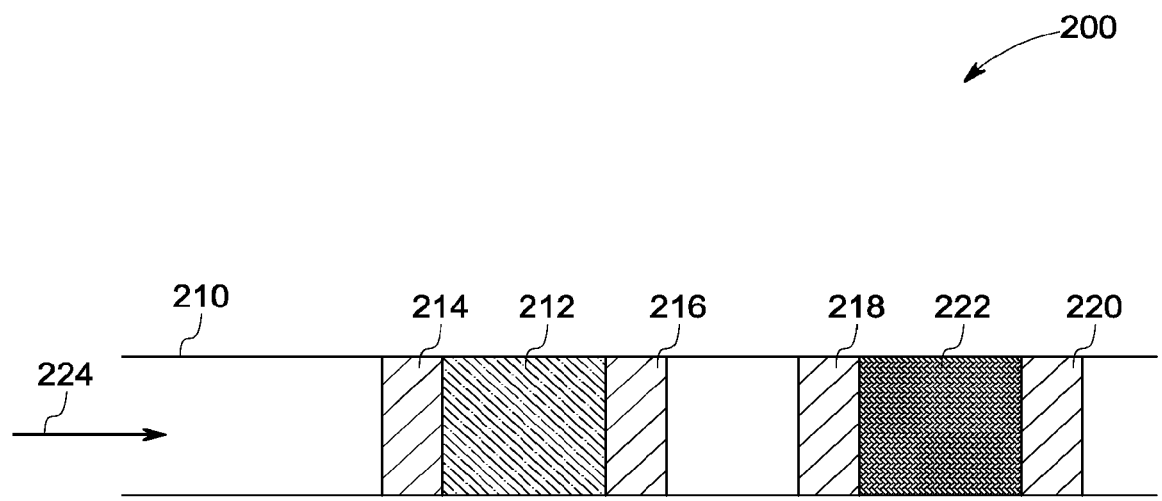
FIG. 2 is a schematic diagram depicting a catalyst system set-up in a furnace in accordance with an embodiment of the invention.

First configuration in accordance with an embodiment of the invention: Referring to FIG. 2, a catalyst system 200 for determining the $NO_x$ reducing capabilities of a first catalytic composition prepared in Example 4 is provided. The first catalytic composition 212, was placed in a quartz tube 210 having an outer diameter of one inch. The first catalytic composition prepared in Example 4 212 was placed inside the quartz tube between two plugs of quartz wool 214 and 216. Each plug of quartz wool spanned a length of about 0.5 inch long along the length of the quartz tube 210 and weighed about 0.5 grams. A gap of about 1 inch long was left in the quartz tube. The quartz tube 210 was then placed in a furnace (not shown in figure).

Figure 3:
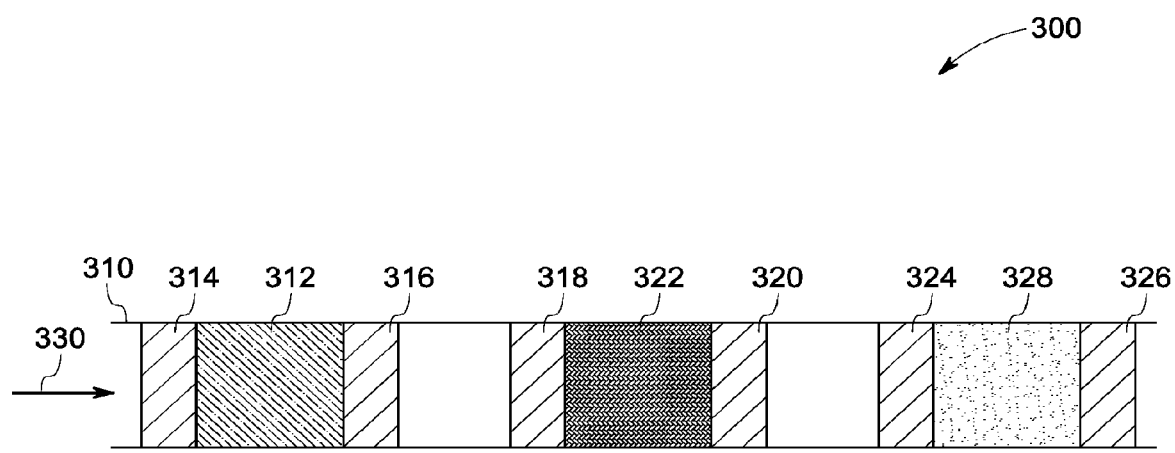
FIG. 3 is a schematic diagram depicting a catalyst system set-up in a furnace in accordance with an embodiment of the invention.

Second configuration in accordance with an embodiment of the invention: Referring to FIG. 3, a catalyst system 300 for determining the $NO_x$ reducing capabilities of a first catalytic composition prepared in Example 4 in combination with a DOC is provided. The first catalytic composition 312, was placed in a quartz tube 310 having an outer diameter of one inch. The first catalytic composition prepared in Example 4 312 was placed inside the quartz tube between two plugs of quartz wool 314 and 316. Each plug of quartz wool spanned a length of about 0.5 inch long along the length of the quartz tube 310 and weighed about 0.5 grams. A gap of about 1 inch long was left in the quartz tube. A gap of about 1 inch long was left in the quartz tube and again two plugs of quartz wool 318, 320 both about 0.5 inch long and 0.5 grams in weight were placed along the length of the quartz tube 310. A diesel oxidation catalyst (Johnson Matthey, DOC) 322 having a bulk volume of 2.95 milliliters was placed between the two plugs of quartz wool 318 and 320. The quartz tube 310 was then placed in a furnace (not shown in figure).

The catalyst system configurations assembled in the quartz tubes as described in FIG. 1, FIG. 2 and FIG. 3, were independently placed in a furnace. In all instances, a simulated exhaust stream 118, 224, and 330, was discharged into the furnace containing the quartz tube. The flow of the simulated exhaust stream through the quartz tube was at a rate of about 3.2 standard liters per minute. The simulated exhaust stream contained nitric oxide (NO; 300 parts per million), water (7 volume percent based on total volumetric flow rate), and oxygen (9 percent volume percent based on total volumetric flow rate). A reductant stream comprising ultra low sulfur diesel (ULSD) was also discharged into the quartz tube. The ratio of the ULSD to $NO_x$ was such that the ratio of the carbon molecules in the ULSD was about 5 to 6 times that of the NO molecules in the stimulated exhaust stream passed over the catalyst. The ULSD contained less than about 15 parts per million sulfur. The gas stream contained 300 parts per million NO. Hence the ratio of carbon:NO of 5:1 translated to about 1500 parts per million carbon atoms from the ULSD. In some embodiments, as provided in Table 2 below, during the flow of the simulated exhaust stream through the furnace, a hydrogen co-reductant was introduced into the furnace along with the reductant ULSD. The hydrogen content was 0 parts per million in some examples and 1000 parts per million in some examples as indicated in the Table 2 given below. The temperatures in the furnace during the respective experiments were 450, 400, 350 and 300 degrees Celsius. The space velocity (SV) of the simulated exhaust streams, the $NO_x$ conversion rates, and the parts per million of other gases are included in the Table 2 below.

Comparative examples CE-1 to CE-8 provide data on $NO_x$ reducing using configuration described in FIG. 1 and Example 2. Example 5 to Example 8 provide data on $NO_x$ reduction using a dual bed catalyst system wherein the first bed includes monolith coated with a mixture of porous alumina and H-ferrierite described in Example 4 and the second bed includes a DOC in the presence of 0 parts per million of hydrogen. Example 9 to Example 12 provide data on $NO_x$ reduction using a dual bed catalyst system wherein the first bed includes monolith coated with a mixture of porous alumina and H-ferrierite described in Example 4 and the second bed includes a DOC in the presence of 1000 parts per million of hydrogen. Example 13 to Example 16 provide data on $NO_x$ reduction using a single mixed bed catalyst system wherein the bed includes monolith coated with a mixture of porous alumina and H-ferrierite described in Example 4 in the presence of 0 parts per million hydrogen. Example 17 to Example 20 provide data on $NO_x$ reduction using a single mixed bed catalyst system wherein the bed includes monolith coated with a mixture of porous alumina and H-ferrierite described in Example 3 in the presence of 1000 parts per million hydrogen.

TABLE 2

| Example | Temp. in Degrees Celsius | Co-reductant Hydrogen ppm | $NO_x$ Conversion in percentage | Ammonia ($NH_3$) in ppm | Nitrous oxide ($N_2O$) in ppm | Hydrogen cyanide (HCN) in ppm | Acetaldehyde ($CH_3CHO$) in ppm | Space velocity in liters per hour over the first catalytic composition | Space velocity in liters per hour over the second catalytic composition | Total space velocity in liters per hour over the dual bed system |
|---|---|---|---|---|---|---|---|---|---|---|
| CE-1 | 450 | 0 | 36.8 | 52.6 | 2.51 | 0.50 | 2.07 | 30000 | — | 30000 |
| CE-2 | 400 | 0 | 33.8 | 51.3 | 2.14 | 1.28 | 3.51 | 30000 | — | 30000 |
| CE-3 | 350 | 0 | 24.5 | 37.1 | 2.10 | 1.86 | 11.4 | 30000 | — | 30000 |
| CE-4 | 300 | 0 | 6.8 | 17.1 | 1.50 | 2.89 | 13.6 | 30000 | — | 30000 |
| CE-5 | 450 | 1000 | 36.7 | 49.1 | 2.73 | 0.31 | 2.18 | 30000 | — | 30000 |
| CE-6 | 400 | 1000 | 42.1 | 52.8 | 2.84 | 0.99 | 3.06 | 30000 | — | 30000 |
| CE-7 | 350 | 1000 | 39.7 | 43.6 | 3.53 | 1.34 | 7.53 | 30000 | — | 30000 |
| CE-8 | 300 | 1000 | 34.4 | 30.6 | 3.97 | 2.10 | 9.79 | 30000 | — | 30000 |
| Example 5 | 450 | 0 | 55.0 | 0.17 | 1.70 | 0.15 | 1.53 | 30000 | 65000 | 21000 |
| Example 6 | 400 | 0 | 59.0 | 1.94 | 1.94 | 0.15 | 1.77 | 30000 | 65000 | 21000 |
| Example 7 | 350 | 0 | 54.0 | 2.77 | 2.77 | 0.28 | 2.41 | 30000 | 65000 | 21000 |
| Example 8 | 300 | 0 | 34.0 | 4.53 | 4.53 | 0.31 | 2.75 | 30000 | 65000 | 21000 |
| Example 9 | 450 | 1000 | 53.0 | 1.90 | 1.90 | 0.00 | 1.35 | 30000 | 65000 | 21000 |
| Example 10 | 400 | 1000 | 64.0 | 2.40 | 2.40 | 0.11 | 1.13 | 30000 | 65000 | 21000 |

TABLE 2-continued

| Example | Temp. in Degrees Celsius | Co-reductant Hydrogen ppm | NO$_x$ Conversion in percentage | Ammonia (NH$_3$) in ppm | Nitrous oxide (N$_2$O) in ppm | Hydrogen cyanide (HCN) in ppm | Acetaldehyde (CH$_3$CHO) in ppm | Space velocity in liters per hour over the first catalytic composition | Space velocity in liters per hour over the second catalytic composition | Total space velocity in liters per hour over the dual bed system |
|---|---|---|---|---|---|---|---|---|---|---|
| Example 11 | 350 | 1000 | 66.0 | 3.50 | 3.50 | 0.17 | 1.63 | 30000 | 65000 | 21000 |
| Example 12 | 300 | 1000 | 62.0 | 5.49 | 5.49 | 0.23 | 1.34 | 30000 | 65000 | 21000 |
| Example 13 | 450 | 0 | 60.0 | 1.66 | 1.66 | 0.07 | 2.11 | 30000 | — | 30000 |
| Example 14 | 400 | 0 | 62.0 | 1.67 | 1.67 | 0.74 | 3.45 | 30000 | — | 30000 |
| Example 15 | 350 | 0 | 54.0 | 1.96 | 1.96 | 1.18 | 5.05 | 30000 | — | 30000 |
| Example 16 | 300 | 0 | 30.0 | 1.87 | 1.87 | 2.61 | 6.28 | 30000 | — | 30000 |
| Example 17 | 450 | 1000 | 55.0 | 1.78 | 1.78 | 0.30 | 1.32 | 30000 | — | 30000 |
| Example 18 | 400 | 1000 | 64.0 | 2.07 | 2.07 | 0.37 | 1.87 | 30000 | — | 30000 |
| Example 19 | 350 | 1000 | 65.0 | 2.92 | 2.92 | 0.82 | 3.62 | 30000 | — | 30000 |
| Example 20 | 300 | 1000 | 60.0 | 4.17 | 4.17 | 1.21 | 3.95 | 30000 | — | 30000 |

From the results it can be seen that the catalyst systems of Examples 5-20 including the first catalytic composition comprising a mixture of the porous alumina with silver with H-Ferrierite shows superior NO$_x$ conversion and lower NH$_3$ slip than the porous alumina with silver alone as shown in comparative examples CE-1 to CE-8. The amounts of nitrous oxide N$_2$O, hydrogen cyanide HCN, and acetaldehyde are also lower for catalyst systems of Examples 5-20 when compared to the comparative examples CE-1 to CE-8.

As used herein the term "bulk volume" means the volume calculated using the outer dimensions of the monolith. As used herein, the term "ammonia (NH$_3$)-slip" is the amount of ammonia (in ppm of total volumetic flow) that is left after the specified catalyst. This could be after the first or second bed, depending on it is described. As used herein the term space velocity represents the relation between volumetric flow and catalyst system bed volume. As a matter of definition, the term "diesel" refers to the distillate commonly available to operate in a diesel engine. While those of skill in the art will recognize that diesel fuel may vary in its precise mixture, that the term diesel encompasses all such varieties in mixture commonly available. This may include diesel fuel derived from a variety of sources, including for example, bio-diesel and petro-diesel. Ultra-low Sulfur Diesel refers to specific blends of diesel fuel commonly used in automotive engines that have very low sulfur levels. Similarly, the term "gasoline" is used to refer to any of the blends of distillate commonly available to operate in a gasoline engine.

In yet another embodiment, an exhaust system is provided. The exhaust system comprises a fuel delivery system configured to deliver a fuel to an engine; an exhaust stream path configured to receive an exhaust stream from the engine, a reductant delivery system configured to deliver a reductant to the exhaust stream path; and a catalyst system disposed in the exhaust stream path. The catalyst system comprises: a first catalytic composition comprising, (i) a first component comprising a zeolite, and (ii) a second component comprising a homogeneous solid mixture containing at least one catalytic metal and at least one metal inorganic network; wherein the pores of the solid mixture have an average diameter in a range of about 1 nanometer to about 15 nanometers; wherein the first component and the second component form an intimate mixture.

Figure 4:
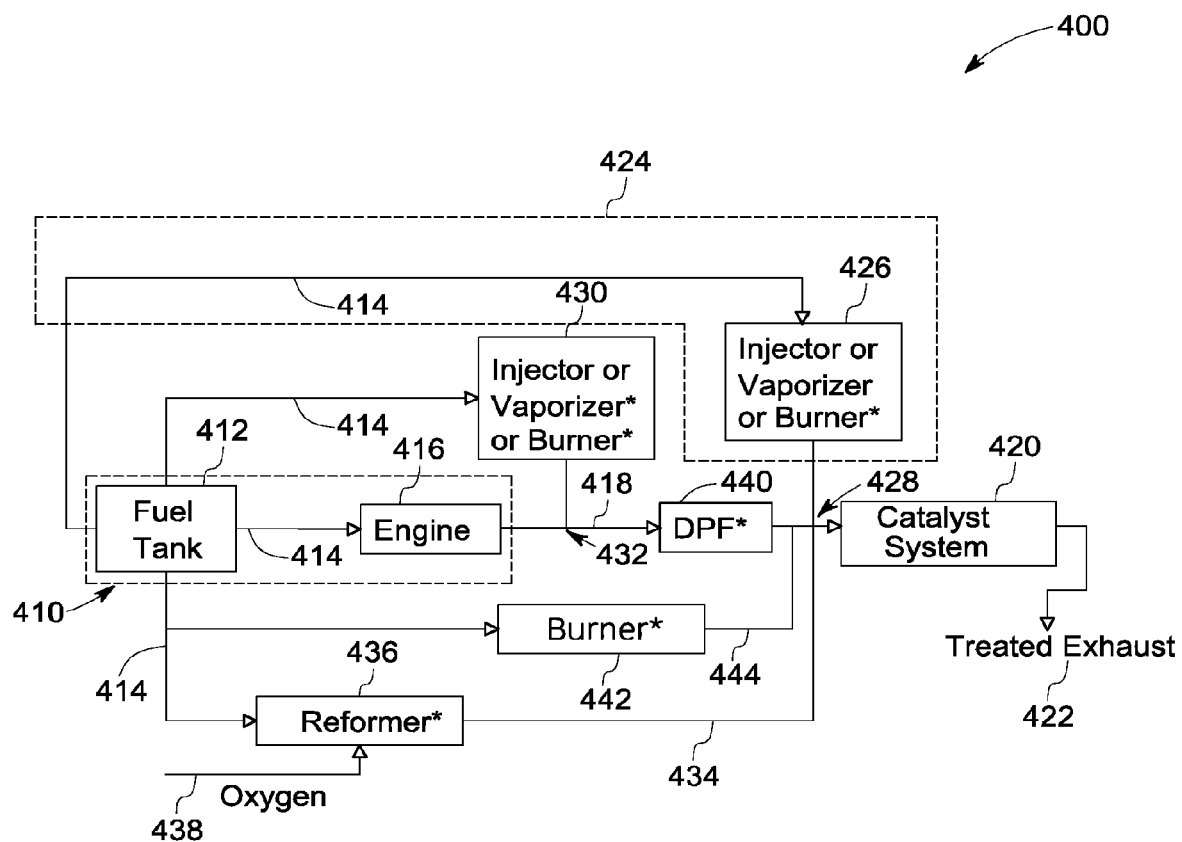
FIG. 4 is a schematic diagram depicting an exhaust system comprising the catalyst system set-up in accordance with an embodiment of the invention.

Referring to FIG. 4, an exhaust system 400 capable of reducing NO$_x$ is provided. The exhaust system 400 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system 410 may also comprise a reductant delivery system 424 configured to deliver a reductant. In one embodiment, the reductant is the fuel 414. In one embodiment, the reductant comprising the fuel 414 is directly delivered to the catalyst system 420 from the fuel tank 412 via an injector or vaporizer or burner 426 through the point of injection 428. In one embodiment, a portion of the fuel 414 may be delivered to the catalyst system 420 by the exhaust stream 418 from the fuel tank 412 via an injector or vaporizer or burner 430 through the point of injection 432. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 428. In one embodiment, a diesel particulate filter DPF 440 is located between the engine 416 and the catalyst system 420 before the point of injection 428. In this embodiment, the reductant comprising the fuel 414 and the co-reductant 434 are delivered to the catalyst system 420 through the point of injection 428 after the exhaust stream 418 is passed through the DPF 440. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 420 has a temperature which is below the optimum operating conditions of the catalyst system 422. In this embodiment, the output of the burner 444 may be located between the DPF 440 and the point of injection 428 of the reductant comprising the fuel 414 and the co-reductant 434 in the exhaust stream 418.

In an exemplary embodiment as shown in FIG. 4, the fuel may comprise ULSD. In certain embodiments as shown in FIG. 4, the reductant comprises the fuel. In certain embodiments wherein the reductant is not the same as the fuel, a separate reductant tank can be used to contain the reductant as will be explained in the description of figures provided below. In embodiments, where the reductant is not the fuel, the reductants may include ethanol, gasoline, mixture of ethanol and gasoline, and mixture of ethanol and diesel. The engine 416 can be any form of internal combustion engine, which produces exhaust (reciprocating or rotating) and can operate on a variety of fuel sources including gas, biodiesel, diesel, and natural gas. The DPF is an optional equipment that may be located up stream of the catalyst system as shown in FIG. 4 or down-stream as will be explained in the figure descriptions given below. The purpose of the filter is to remove particulate mater (soot and ash) from the exhaust stream. In certain embodiments (not shown in figure), the DPF may be paired with a diesel injector to regenerate the DPF by burning off soot. The burner as described above burns diesel fuel to increase the temperature of the exhaust stream which can be used to improve the performance of the catalyst in situation where the exhaust temperature is below the optimum operating conditions of the catalyst. The burner is placed upstream of the diesel and the reformer injection which is just before the catalyst system. In the case where DPF is upstream of the catalyst system the burner may be upstream or downstream of DPF. The reformer generates the co-reductant hydrogen from the diesel fuel and oxygen source (most likely from air). Carbon monoxide, carbon dioxide and water, can also be generated in the reforming process. The reformer may also perform water gas shift reaction to increase yield of hydrogen. The injector or vaporizer or burner is the means by which the reductant, for example, diesel fuel, is delivered to the catalyst. The reductant can either be vaporized and delivered as a gas stream or be atomized or sprayed into the exhaust (or onto the catalyst system) with an injector. The catalyst system 420 may include the catalyst system configurations described herein above in the example section. Additionally the exhaust system may include other equipments such as pumps, valves, sensors, control loops, computers (control logic), storage tanks, mixers (gas or liquid), insulation, flow paths, separators, etc. as would be appreciated by one skilled in the art.

Figure 5:
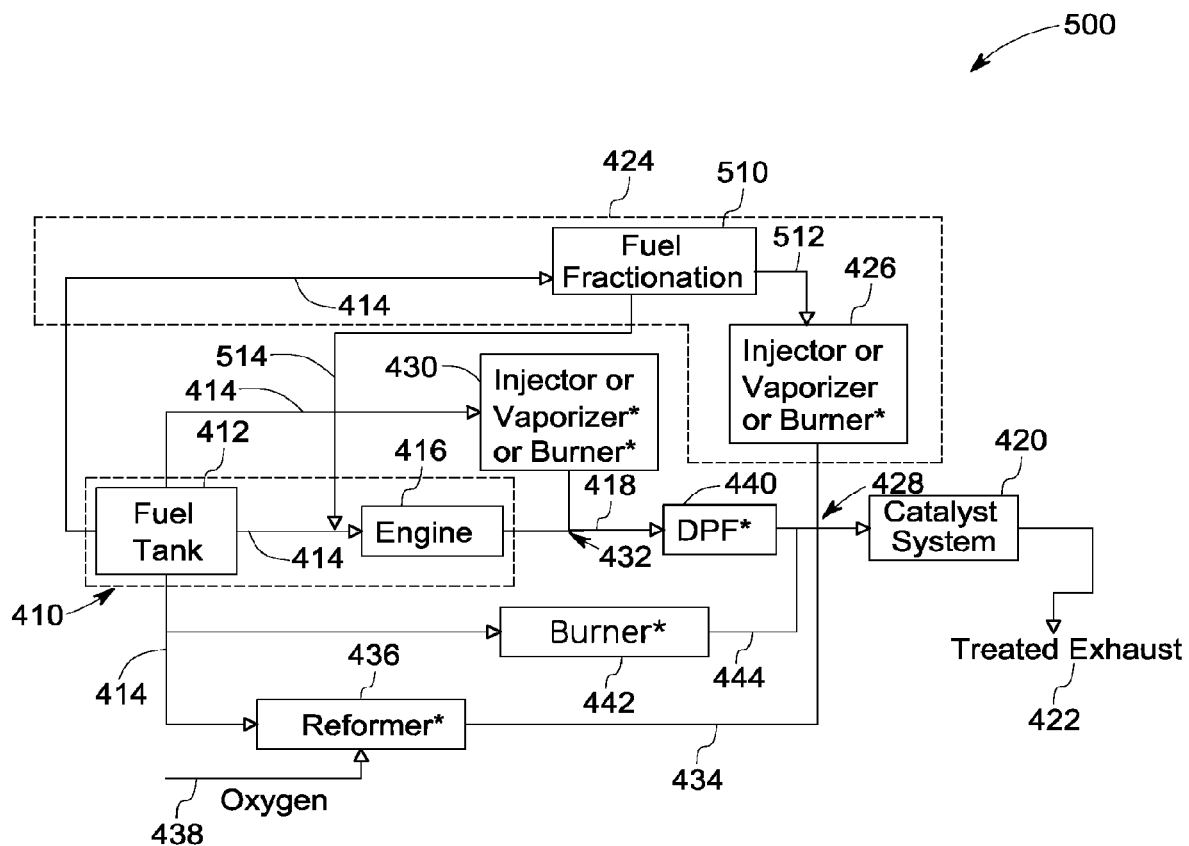
FIG. 5 is a schematic diagram depicting an exhaust system comprising the catalyst system set-up in accordance with an embodiment of the invention.

Referring to FIG. 5, an exhaust system 500 capable of reducing $NO_x$ is provided. The exhaust system 500 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system 410 may also comprise a reductant delivery system 424 configured to deliver a reductant. The reductant delivery system 424 comprises a fuel fractionator 510 and an injector or vaporizer or burner 426. In one embodiment, the reductant comprising the fuel 414 is first passed through the fuel fractionator 510 to provide a light fuel fraction 512 and a heavy fuel fraction 514. The light fuel fraction 512 comprises hydrocarbons having an average carbon chain length of less than about 12 carbons and the heavy fuel fraction 514 comprises hydrocarbons having an average carbon chain length of greater than about 12 carbons. The light fuel fraction 512 is delivered to the catalyst system 420 from the fuel tank 412 via an injector or vaporizer or burner 426 through the point of injection 428. In one embodiment, a portion of the fuel 414 may be delivered to the catalyst system 420 by the exhaust stream 418 from the fuel tank 412 via an injector or vaporizer or burner 430 through the point of injection 432. The heavy fuel fraction 514 is delivered to the engine 416 through the fuel 414. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 428. In one embodiment, a DPF 440 is located between the engine 416 and the catalyst system 420 before the point of injection 428. In this embodiment, the reductant comprising the light fuel fraction 512 and the co-reductant 434 are delivered to the catalyst system 420 after the exhaust stream 418 is passed through the DPF 440 through the point of injection 428. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 may be located between the DPF 440 and the point of injection 428 of the reductant comprising the light fuel fraction 512 and the co-reductant 434 in the exhaust stream 418.

Figure 6:
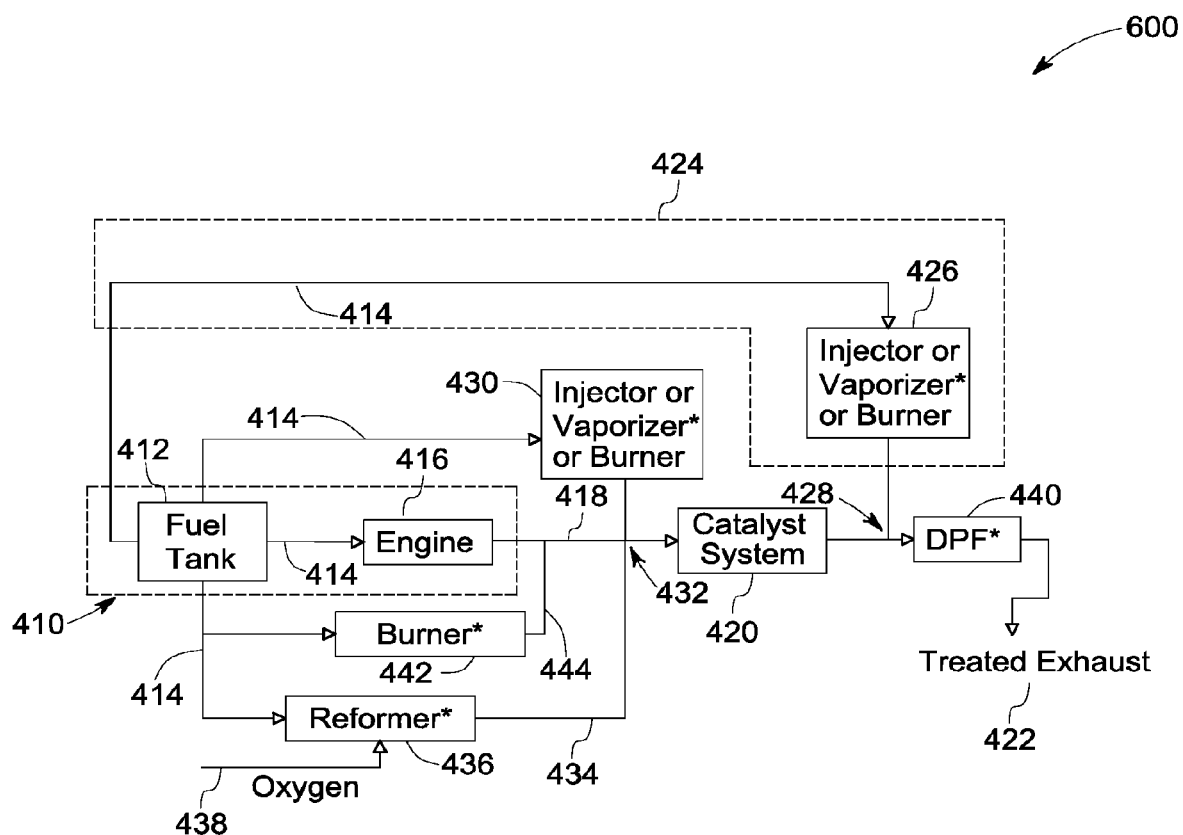
FIG. 6 is a schematic diagram depicting an exhaust system comprising the catalyst system set-up in accordance with an embodiment of the invention.

Referring to FIG. 6, an exhaust system 600 capable of reducing $NO_x$ is provided. The exhaust system 600 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system may also comprise a reductant delivery system 424 configured to deliver a reductant. In one embodiment, the reductant is the fuel 414. In one embodiment, the reductant comprising the fuel 414 is directly delivered to the catalyst system 420 from the fuel tank 412 via an injector or vaporizer or burner 426 through the point of injection 428. In one embodiment, a portion of the fuel 414 may be delivered to the catalyst system 420 by the exhaust stream 418 from the fuel tank 412 via an injector or vaporizer or burner 430 through the point of injection 432. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 432. In one embodiment, a DPF 440 is located after the catalyst system 420 and the exhaust stream 418 is passed through the catalyst system 420 and the DPF 440 before exiting as the treated exhaust stream 422. In this embodiment, the reductant comprising the fuel 414 is delivered to the exhaust stream 418 through the point of injection 428. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 is connected in the exhaust stream between the engine 418 and the point of injection 432 of the reductant comprising the fuel 414 and the co-reductant 434 in the exhaust stream 418.

Figure 7:
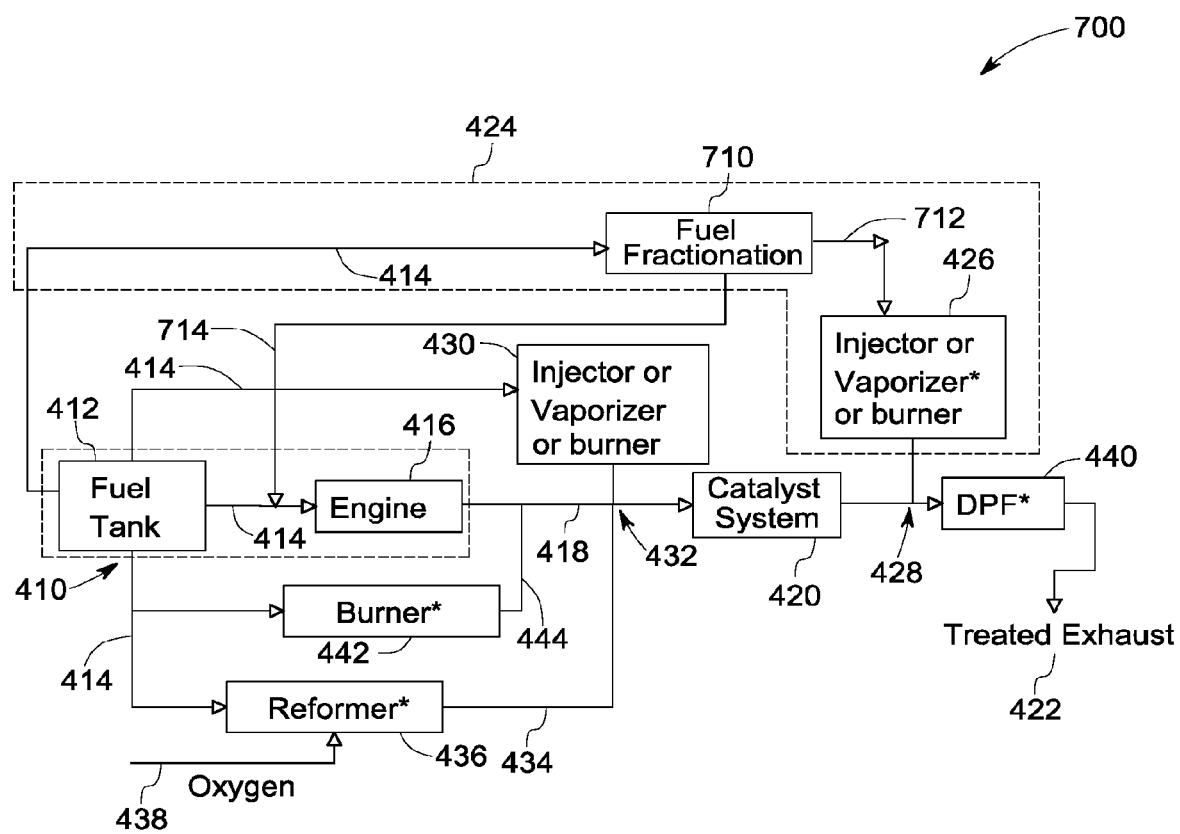
FIG. 7 is a schematic diagram depicting an exhaust system comprising the catalyst system set-up in accordance with an embodiment of the invention.

Referring to FIG. 7, an exhaust system 700 capable of reducing $NO_x$ is provided. The exhaust system 700 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system may also comprise a reductant delivery system 424 configured to deliver a reductant. The reductant delivery system 424 comprises a fuel fractionator 510 and an injector or vaporizer or burner 426. In one embodiment, the reductant comprising the fuel 414 is first passed through the fuel fractionator 710 to provide a light fuel fraction 712 and a heavy fuel fraction 714. The light fuel fraction 712 comprises hydrocarbons having an average carbon chain length of less than about 12 carbons and the heavy fuel fraction 714 comprises hydrocarbons having an average carbon chain length of greater than about 12 carbons. The light fuel fraction 712 is delivered to the catalyst system 420 from the fuel tank 412 via an injector or vaporizer or burner 426 through the point of injection 428. In one embodiment, a portion of the fuel 414 may be delivered to the catalyst system 420 by the exhaust stream 418 from the fuel tank 412 via an injector or vaporizer or burner 430 through the point of injection 432. The heavy fuel fraction 714 is delivered to the engine 416 through the fuel 414. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 432. In one embodiment, a DPF 440 is located after the catalyst system 420 and exhaust stream 418 is passed through the catalyst system 420 and the DPF 440 before exiting as the treated exhaust stream 422. In this embodiment, the reductant comprising the light fuel fraction 712 and the co-reductant 434 are delivered to the exhaust stream 418 through the point of injection 428. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 is connected in the exhaust stream between the engine 416 and the point of injection 432 of the reductant comprising fuel 414 and the co-reductant 434 in the exhaust stream 418.

Figure 8:
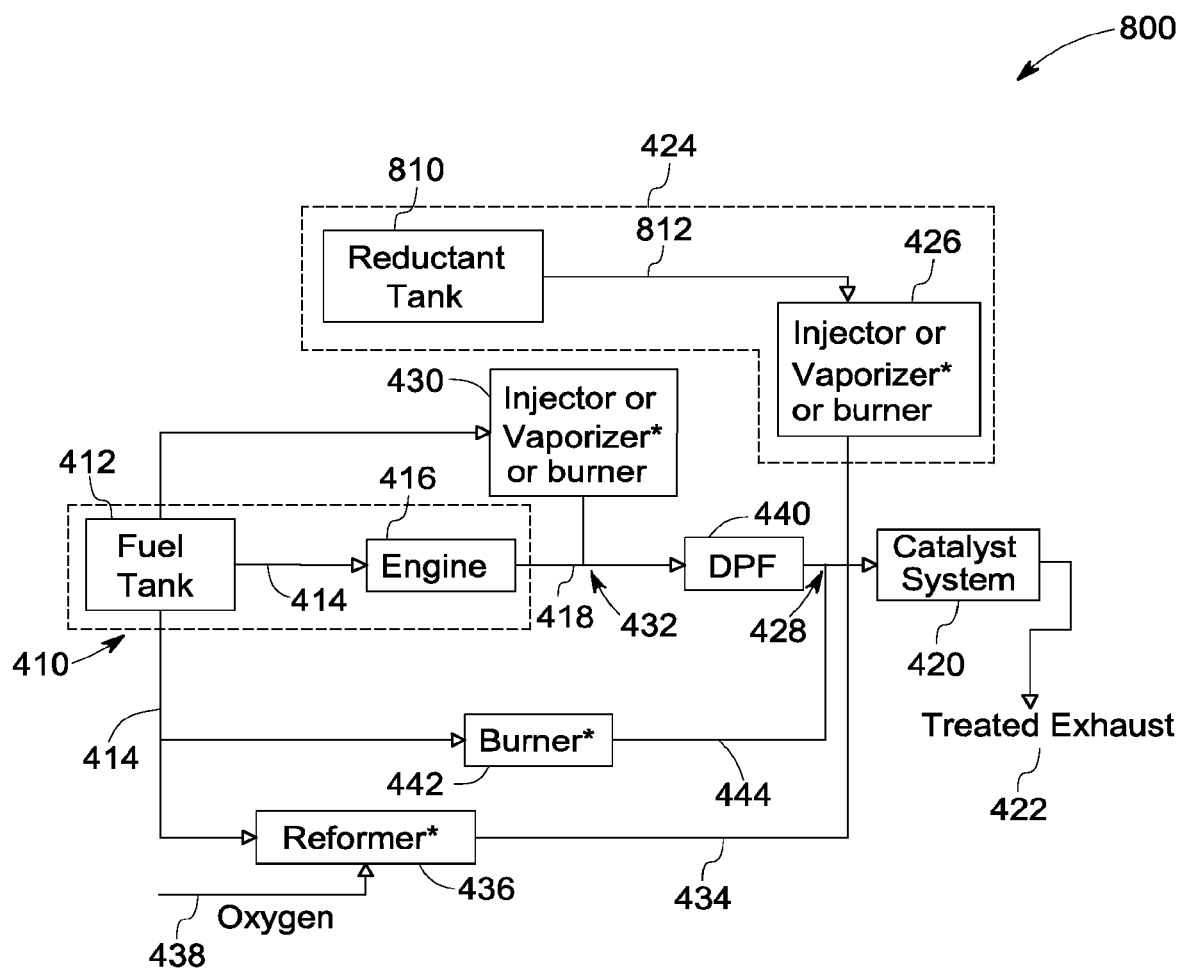
FIG. 8 is a schematic diagram depicting an exhaust system comprising the catalyst system set-up in accordance with an embodiment of the invention.

Referring to FIG. 8, an exhaust system 800 capable of reducing $NO_x$ is provided. The exhaust system 800 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system may also comprise a reductant delivery system 424 configured to deliver a reductant. In one embodiment, the reductant is not the same as the fuel. In this embodiment, a reductant tank 810 is provided to deliver the reductant 812 to the catalyst system 422 via the injector or vaporizer or burner 426 to the point of injection 428. In one embodiment, a portion of the fuel 414 may be delivered to the catalyst system 420 by the exhaust stream 418 from the fuel tank 412 via an injector or vaporizer or burner 430 through the point of injection 432. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 428. In one embodiment, a DPF 440 is located between the engine 416 and the catalyst system 420 before the point of injection 428. In this embodiment, the reductant 812 and the co-reductant 434 are delivered to the catalyst system 420 through the point of injection 428 after the exhaust stream 418 is passed through the DPF 440. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 may be located between the DPF 440 and the point of injection 428 of the reductant 812 and the co-reductant 434 in the exhaust stream 418.

Figure 9:
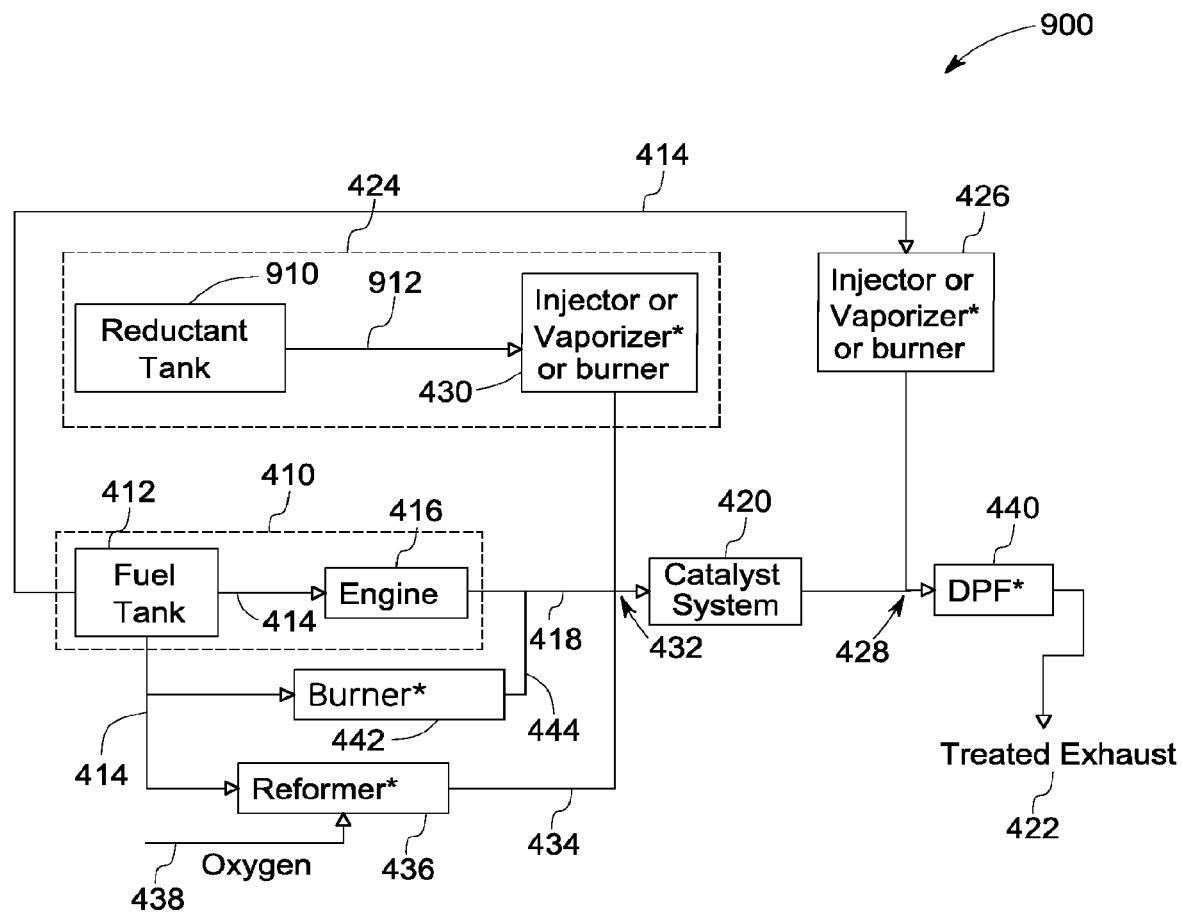
FIG. 9 is a schematic diagram depicting an exhaust system comprising the catalyst system set-up in accordance with an embodiment of the invention.

Referring to FIG. 9, an exhaust system 900 capable of reducing $NO_x$ is provided. The exhaust system 900 comprises a fuel delivery system 410 which is configured to deliver a fuel 414 contained in a fuel tank 412 to an engine 416. An exhaust stream 418 is generated by the engine 416 and this exhaust stream 418 is passed through a catalyst system 420 to provide a treated exhaust stream 422. The fuel delivery system may also comprise a reductant delivery system 424 configured to deliver a reductant. In one embodiment, the reductant is not the same as the fuel. In this embodiment, a reductant tank 910 is provided to deliver the reductant 912 to the exhaust stream 418 from the reductant tank 910 via an injector or vaporizer or burner 430 and the exhaust stream 418 carries the reductant 912 to the catalyst system 420 through the point of injection 432. In one embodiment, a portion of the fuel 414 is delivered to the catalyst system 420 from the fuel tank 412 via an injector or vaporizer or burner 426 through the point of injection 428. In one embodiment, the reductant delivery system 424 further comprises a co-reductant 434. In one embodiment, the co-reductant 434 may be generated by passing the fuel 414 through a reformer 436. A source of oxygen 438 is provided to the reformer 436. In one embodiment, the co-reductant 434 generated by the reformer 436 includes a syn-gas comprising hydrogen and carbon monoxide. The co-reductant 434 is passed through the catalyst system 420 through the point of injection 432. In one embodiment, a DPF 440 is located after the catalyst system 420 and exhaust stream 418 is passed through the catalyst system 420 and the DPF 440 before exiting as the treated exhaust stream 422. In this embodiment, the reductant comprising the fuel 414 is delivered to the exhaust stream 418 through the point of injection 428 which lies between the catalyst system 420 and the DPF 440. In one embodiment, a burner 442 is provided between the fuel tank 412 and the catalyst system 420. The burner 442 burns the fuel 414 to increase the temperature of the exhaust stream 418 which can be used to improve the performance of the catalyst system 420 in situations where the exhaust stream 418 has a temperature which is below the optimum operating conditions of the catalyst system 420. In this embodiment, the output of the burner 444 is connected in the exhaust stream between the engine 418 and the point of injection 432 of the reductant 912 and the co-reductant 434 in the exhaust stream 418.

In yet another embodiment, an exhaust system is provided. The exhaust system comprises a fuel delivery system configured to deliver a fuel to an engine; an exhaust stream path configured to receive an exhaust stream from the engine, a reductant delivery system configured to deliver a reductant to the exhaust stream path; and a catalyst system disposed in the exhaust stream path. The catalyst system comprises: a first catalytic composition comprising, (i) a first component comprising a zeolite, and (ii) a second component comprising a homogeneous solid mixture containing at least one catalytic metal and at least one metal inorganic network; wherein the pores of the solid mixture have an average diameter in a range of about 1 nanometer to about 15 nanometers; wherein the first component and the second component form an intimate mixture. The catalyst system further comprises a second catalytic composition disposed downstream from the first catalytic composition; the second catalytic composition comprising a first catalytic material disposed on a first substrate, wherein the first catalytic material is selected from the group consisting of platinum, palladium, ruthenium, rubidium, osmium, and iridium.

In one embodiment, the second component can be comprised of a catalyst composition made by the method disclosed in commonly owned U.S. patent application Ser. No. 12/789,592 now U.S. Pat. No. 8,871,669, herein incorporated by reference in its entirety. The method comprises reacting a reactive solution and a templating agent to form a gel; and calcining the gel to form a catalyst composition comprising a homogeneous solid mixture. The homogenous solid mixture contains (i) at least one catalytic metal and (ii) at least one metal inorganic network. The templating agent comprises an octylphenol ethoxylate having a structure [I]:

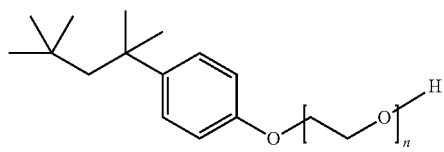

wherein "n" is an integer having a value of about 8 to 20.

In another embodiment, the homogenous solid mixture comprises pores having an average diameter in a range of about 1 nanometer to about 15 nanometers. The pores are formed by using a templating agent comprising an octylphenol ethoxylate having a structure [I]:

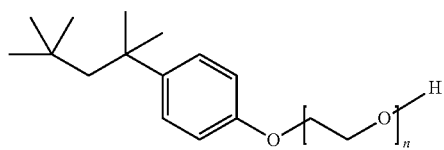

wherein "n" is an integer having a value of about 8 to 20.

Examples 1A-2A

All components are commercially available from common chemical suppliers. The component and the source are listed in Table 1A given below.

TABLE 1A

| Component | Source |
|---|---|
| Ethylacetoacetate | Aldrich |
| TRITON ™ X-114 | Aldrich |
| TRITON ™ X-102 | Aldrich |
| TRITON ™ X-165 | Aldrich |
| Aluminum sec-butoxide | Gelest |
| Silver nitrate | GFS Chemicals Inc. |
| Iso propyl alcohol | EM Scientific |

A catalyst composition that can be used as the second component is manufactured by making a first solution, a second solution and a third solution, which are mixed together. The chemicals used for making the first solution, second solution and third solution are listed in Table 2A below. The first solution was prepared by mixing ethyl acetoacetate, TRITON™ X and isopropyl alcohol. The mixing was carried out in a 5 liter, 3-neck flask equipped with a feed tube from a peristaltic pump, a condenser, and a mechanical stirrer. The second solution was prepared by mixing aluminum sec-butoxide and isopropyl alcohol. The second solution was added to the first solution at an ambient temperature of about 25 degrees Centigrade with stirring and held at 25 degrees Centigrade for about 30 minutes. The third solution was prepared by mixing silver nitrate, water, and isopropyl alcohol. The third solution was prepared by first dissolving silver nitrate in water and the resultant solution was diluted with isopropyl alcohol. The third solution was added to the mixture of the first solution and the second solution via the feed tube under stirring at a rate of about 4 milliliters per minute at a temperature of about 25 degrees Centigrade. The contents of the flask were then heated to reflux and maintained under reflux for about 24 hours. The resultant solution was maroon in color.

The flask was then cooled to a temperature of about 25 degrees Centigrade and the contents filtered. The resultant solid was Soxhlet extracted using ethanol for a period of about 1 day under reflux. The resultant brown solid was then dried under vacuum at a temperature of 100 degrees Centigrade and 30 millimeters of mercury to yield the reaction product in the form of a white powder. PYROLYSIS: The dry reaction product was heated under a flow of nitrogen in a tube furnace from a temperature of about 25 degrees Centigrade to about 550 degrees Centigrade at a heating rate of 2 degrees Centigrade/minute. The temperature was then maintained at 550 degrees Centigrade for 1 hour. The reaction product was then calcined in the presence of air at 550 degrees Centigrade for 5 hours to produce a metal inorganic complex. Weight of the powder after calcination was determined and is provided in Table 2A below.

TABLE 2A

| Examples/Chemicals | EtAcOAc grams | Al(O$^{sec}$Bu)$_3$ grams | TRITON™ X- grams | AgNO$_3$ grams | Water mililiters | IPA mililiters | Rate of addition of 3$^{rd}$ solution ml/min |
|---|---|---|---|---|---|---|---|
| Example 1A | 13.41 | 249.8 | 69.9 (X102) | 2.58 | 37 | 300 + 1000 + 425 | 3.6 |
| Example 2A | 13.41 | 250.3 | 69.7 (X165) | 2.56 | 37 | 300 + 1000 + 425 | 3.6 |

While the systems and techniques herein have been described with reference to exemplary embodiments, it will be understood by those skilled in the art that various changes may be made and equivalents may be substituted for elements thereof without departing from their essential scope. In addition, many modifications may be made to adapt a particular situation or material to the teachings of a given embodiment without departing from the essential scope thereof. Therefore, it is intended that these systems and techniques are not limited to the particular embodiments disclosed as the best mode contemplated for carrying them out.

The various embodiments described herein may be examples of catalytic compositions and systems using such compositions and techniques for manufacturing these embodiments. Any given embodiment may provide one or more of the advantages recited, but need not provide all objects or advantages recited for any other embodiment. Those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description may enable those of ordinary skill in the art to make and use embodiments having alternative elements that likewise correspond to the elements recited herein. While only certain features and embodiments have been illustrated and described herein, many modifications and changes may occur to one of ordinary skill in the relevant art. Thus, it is intended that the scope of the invention disclosed should not be limited by the particular disclosed embodiments described above, but should be determined only by a fair reading of the claims that follow.

The invention claimed is:

1. A method of producing a catalyst composition comprising mixing
   (i) a first component comprising particles of a zeolite, and
   (ii) a second component comprising particles comprised of a homogeneous solid mixture containing at least one catalytic metal and at least one metal inorganic support,
   wherein at least a portion of particles of the first component and at least a portion of the particles of the second component are in contact with one another to form an intimate mixture, and
   wherein the homogeneous solid mixture is produced by mixing a reactive solution comprising a precursor of the metal inorganic support and a templating agent with a precursor of the catalyst metal, and calcining the mixture to form the homogeneous solid mixture.

2. The method of claim 1 wherein the particles of the second component have pores that have an average diameter of about 1 nanometer to about 15 nanometers.

3. The method of claim 1 wherein the homogeneous solid mixture is produced from a gel formed in the presence of a solvent, modifier, an inorganic halide, sulfate, nitrate, and/or sulfide salt precursor of the catalytic metal, an inorganic precursor of the metal inorganic network, and a templating agent, wherein the templating agent comprises an octylphenol ethoxylate having a structure [I]

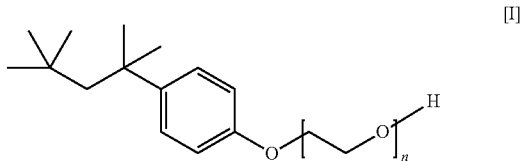

wherein "n" is an integer having a value of about 8 to 20.

4. The method of claim 1, wherein the catalytic metal comprises alkali metals, alkaline earth metals, transition metals, or a combination thereof.

5. The method of claim 1, wherein the catalytic metal comprises silver, platinum, gold, palladium, iron, nickel, cobalt, gallium, indium, ruthenium, rhodium, osmium, iridium, or combinations of at least two of the foregoing metals.

6. The method of claim 1, wherein the catalytic metal comprises silver.

7. The method of claim 6, wherein the metal inorganic support comprises alumina.

8. The method of claim 1, wherein the zeolite comprises zeolite Y, zeolite beta, mordenite, ferrierite, ZSM-5, ZSM-12, ZSM-22, ZSM-23, ZSM-34, ZSM-35, ZSM-38, ZSM-48; ZSM-50; ZSM-57, zeolite A, zeolite X or a combination comprising at least two of the foregoing.

9. The method of claim 1, wherein the catalyst composition further comprises at least one promoting metal.

10. The method of claim 9, wherein the at least one promoting metal is selected from the group consisting gallium, indium, gold, vanadium, zinc, tin, bismuth, cobalt, molybdenum, and tungsten.

* * * * *